(12) United States Patent
Liang et al.

(10) Patent No.: US 12,706,349 B1
(45) Date of Patent: Aug. 11, 2026

(54) BATTERY TRANSPORTATION PROTECTION DEVICE

(71) Applicants: CONTEMPORARY AMPEREX TECHNOLOGY CO., LIMITED, Ningde (CN); NANJING XINRUI PACKAGING CO., LTD., Nanjing (CN)

(72) Inventors: Feifei Liang, Ningde (CN); Xiaoning Wang, Ningde (CN); Chen Wang, Nanjing (CN); Wenhua Zhang, Nanjing (CN); Yuguang Su, Nanjing (CN)

(73) Assignees: CONTEMPORARY AMPEREX TECHNOLOGY CO., LIMITED, Ningde (CN); NANJING XINRUI PACKAGING CO., LTD., Nanjing (CN)

( * ) Notice: Subject to any disclaimer, the term of this patent is extended or adjusted under 35 U.S.C. 154(b) by 0 days.

(21) Appl. No.: 19/413,017

(22) Filed: Dec. 9, 2025

Related U.S. Application Data

(63) Continuation of application No. PCT/CN2025/124980, filed on Sep. 28, 2025.

(30) Foreign Application Priority Data

Apr. 14, 2025 (CN) ........................ 202510464940.4

(51) Int. Cl.
*H01M 50/383* (2021.01)
*A62C 3/16* (2006.01)
(Continued)

(52) U.S. Cl.
CPC ............ *H01M 50/383* (2021.01); *A62C 3/16* (2013.01); *A62C 35/13* (2013.01);
(Continued)

(58) Field of Classification Search
None
See application file for complete search history.

(56) References Cited

U.S. PATENT DOCUMENTS

2003/0113596 A1* 6/2003 Huang .................. B01D 53/02 429/410
2013/0236750 A1* 9/2013 Sato .................. H01M 10/0422 429/57
(Continued)

FOREIGN PATENT DOCUMENTS

CN 218187604 U 1/2023
CN 218602671 U 3/2023
(Continued)

OTHER PUBLICATIONS

Machine English translation of CN222126879U (Year: 2024).*
(Continued)

*Primary Examiner* — Jeffrey T Barton
*Assistant Examiner* — Karen J. Armstrong
(74) *Attorney, Agent, or Firm* — ANOVA LAW GROUP, PLLC

(57) ABSTRACT

A battery transportation protection device. The battery transportation protection device includes a case, where the case includes a case cover and a case body. The case body has a first opening, and the case cover covers the first opening to define, together with the case body, a first accommodation cavity for accommodating a battery. A pressure relief channel is formed inside the case cover, and the pressure relief channel is in communication with the first accommodation cavity and configured to discharge gas from the first accommodation cavity.

18 Claims, 14 Drawing Sheets

(51) Int. Cl.

| | |
|---|---|
| ***A62C 35/13*** | (2006.01) |
| ***H01M 10/658*** | (2014.01) |
| ***H01M 50/249*** | (2021.01) |
| ***H01M 50/271*** | (2021.01) |
| ***H01M 50/30*** | (2021.01) |
| ***H01M 50/358*** | (2021.01) |

(52) U.S. Cl.

CPC ....... *H01M 10/658* (2015.04); *H01M 50/249* (2021.01); *H01M 50/271* (2021.01); *H01M 50/358* (2021.01); *H01M 50/394* (2021.01); *H01M 2220/20* (2013.01)

(56) References Cited

U.S. PATENT DOCUMENTS

| | | | | |
|---|---|---|---|---|
| 2020/0052262 | A1 | 2/2020 | King | |
| 2024/0405329 | A1 * | 12/2024 | Han | .................... H01M 10/658 |

FOREIGN PATENT DOCUMENTS

| | | | | | |
|---|---|---|---|---|---|
| CN | 116613457 | A | | 8/2023 | |
| CN | 221815611 | U | | 10/2024 | |
| CN | 222126878 | U | | 12/2024 | |
| CN | 222126879 | U | | 12/2024 | |
| CN | 222453155 | U | | 2/2025 | |
| CN | 119601890 | A | * | 3/2025 | .............. B60L 50/66 |
| CN | 222637557 | U | | 3/2025 | |
| CN | 120517686 | A | | 8/2025 | |
| CN | 120517687 | A | | 8/2025 | |
| EP | 4358264 | A1 | | 4/2024 | |
| EP | 4386958 | A1 | | 6/2024 | |
| WO | 2023165291 | A1 | | 9/2023 | |

OTHER PUBLICATIONS

Machine English translation of CN119601890A (Year: 2025).*

Machine English translation of CN222126878U (Year: 2024).*

Machine English translation of WO2023165291A1 (Year: 2023).*

The World Intellectual Property Organization (WIPO) International Search Report for PCT/CN2025/124980 Dec. 2, 2025 7 Pages (including translation).

IP Australia Examination report No. 1 for Application No. 2025271512 Feb. 20, 2026 6 pages.

* cited by examiner

BATTERY TRANSPORTATION PROTECTION DEVICE

CROSS-REFERENCE TO RELATED APPLICATIONS

This application is a continuation of International Application No. PCT/CN2025/124980, filed on Sep. 28, 2025, which claims priority to Chinese Patent Application No. 202510464940.4, filed on Apr. 14, 2025 and entitled "BATTERY TRANSPORTATION PROTECTION DEVICE", which are incorporated herein by reference in their entirety.

TECHNICAL FIELD

This application relates to the field of battery technology, and specifically, to a battery transportation protection device.

BACKGROUND

Energy saving and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development.

In the development of battery technology, how the reliability of battery transportation protection devices in transporting batteries is improved is an urgent technical issue to be addressed.

SUMMARY

This application provides a battery transportation protection device, to improve the reliability of the battery transportation protection device in transporting batteries.

This application is implemented using the following technical solutions.

According to a first aspect, this application provides a battery transportation protection device. The battery transportation protection device includes a case, where the case includes a case cover and a case body. The case body has a first opening, and the case cover covers the first opening to define, together with the case body, a first accommodation cavity for accommodating a battery. A pressure relief channel is formed inside the case cover, and the pressure relief channel is in communication with the first accommodation cavity and configured to discharge gas from the first accommodation cavity.

In the technical solution of the embodiments of this application, battery thermal runaway is typically accompanied by gas generation. The accumulation of gases within the first accommodation cavity leads to an increase in air pressure within the first accommodation cavity, which poses risks of causing losses due to explosion or forceful ejection of the case cover. The pressure relief channel is disposed to discharge gas generated by the battery, reducing the risk of excessive air pressure in the first accommodation cavity, thereby improving reliability of the battery transportation protection device in transporting batteries. Additionally, the pressure relief channel is disposed inside the case cover, that is, the pressure relief channel is disposed above the first accommodation cavity, so that the pressure relief channel shares the same footprint as the case body, reducing the dimensions of the battery transportation protection device in the horizontal direction and facilitating the spatial arrangement of the battery transportation protection device during transportation.

In some embodiments, a second accommodation cavity is formed inside the case cover, and the battery transportation protection device further includes a pressure relief module, where the pressure relief module is disposed in the second accommodation cavity, the pressure relief module is provided with a smoke inlet and a smoke outlet at two ends, respectively, the pressure relief channel is formed inside the pressure relief module, and the pressure relief channel connects the smoke inlet and the smoke outlet.

In the technical solution of the embodiments of this application, the pressure relief modules are disposed inside the case cover to define the pressure relief channel, reducing the risk of excessive air pressure in the first accommodation cavity, thereby improving reliability of the battery transportation protection device in transporting batteries.

In some embodiments, the pressure relief module is provided in plurality, the plurality of pressure relief modules are arranged in two rows, the two rows of pressure relief modules are spaced apart along a second direction, and the plurality of pressure relief modules in each row of the pressure relief modules are arranged along a first direction, the first direction, the second direction, and a direction of gravity being mutually perpendicular. The smoke inlets of each row of pressure relief modules are disposed at an end close to the other row of pressure relief modules, and the smoke outlets of each row of pressure relief modules are disposed at an end far from the other row of pressure relief modules.

In the technical solution of the embodiments of this application, the smoke inlets of the two rows of pressure relief modules face each other, so that gas in the first accommodation cavity can be discharged simultaneously from the two rows of pressure relief modules from the middle. This improves the efficiency of gas discharge, and reduces the risk of excessive air pressure in the first accommodation cavity, thereby improving reliability of the battery transportation protection device in transporting batteries.

In some embodiments, the battery transportation protection device further includes a gas collection cover, where the gas collection cover is disposed between the two rows of pressure relief modules and connected to the plurality of pressure relief modules. An internal space of the gas collection cover connects the first accommodation cavity and the plurality of smoke inlets.

In the technical solution of the embodiments of this application, the gas collection cover is disposed to connect the communication hole and the smoke inlets, so that gas from the first accommodation cavity can be collected in the gas collection cover, facilitating the discharge of gas from the first accommodation cavity by the pressure relief modules. This reduces the risk of excessive air pressure in the first accommodation cavity, thereby improving reliability of the battery transportation protection device in transporting batteries.

In some embodiments, two gas collection covers are provided, and the two gas collection covers are connected to the two rows of pressure relief modules, respectively.

In the technical solution of the embodiments of this application, two gas collection covers are disposed to respectively connect to the two rows of pressure relief modules, that is, the two rows of pressure relief modules are not directly connected, allowing for individual maintenance of the two rows of pressure relief modules, thereby improving the maintenance convenience of the pressure relief modules.

In some embodiments, the pressure relief module includes a housing and a filter, where an internal space of the housing forms the pressure relief channel, and the filter is disposed within the pressure relief channel.

In the technical solution of the embodiments of this application, when a battery undergoes thermal runaway and generates gas, the gas typically contains toxic gases and solid impurities from the battery. The filter is disposed in the pressure relief channel to filter the gas in the pressure relief channel, reducing the risk of environmental pollution and losses caused by the discharged gas.

In some embodiments, the filter includes a stainless steel fiber filter, a glass fiber filter, and a ceramic fiber filter, where along a gas flow direction in the pressure relief channel, the stainless steel fiber filter, the glass fiber filter, and the ceramic fiber filter are arranged in sequence.

The gas generated during battery thermal runaway has a high temperature, and the stainless steel fiber filter can withstand high temperatures. In the technical solution of the embodiments of this application, the stainless steel fiber filter, the glass fiber filter, and the ceramic fiber filter are arranged in sequence along the gas flow direction in the pressure relief channel to filter toxic gases and solid impurities from the battery, thereby improving the reliability of the filter, and reducing the impact of the discharged gas on the external environment.

In some embodiments, the pressure relief module further includes a guide plate, where the guide plate is disposed within the housing.

In the technical solution of the embodiments of this application, the guide plate is disposed within the housing, reducing the flow rate of gas in the pressure relief channel, and increasing the contact time between the gas passing through the pressure relief channel and the filter. This improves the filtration effect of the filter and reduces the impact of the discharged gas on the external environment.

In some embodiments, the battery transportation protection device further includes a detection component and a firefighting mechanism. The detection component is disposed on the case, where the detection component is configured to detect an environmental parameter within the first accommodation cavity. The firefighting mechanism is connected to the case cover, where the firefighting mechanism is configured to release a firefighting medium into the first accommodation cavity when the environmental parameter exceeds a threshold.

In the technical solution of the embodiments of this application, during battery transportation, the battery is accommodated in the first accommodation cavity of the case. When the battery undergoes thermal runaway or catches fire, temperature may increase, combustible gases may be generated, and air pressure within the first accommodation cavity may increase. The detection component is disposed to detect an environmental parameter (temperature, combustible gas concentration, air pressure, or the like) within the first accommodation cavity, and when the environmental parameter detected by the detection component exceeds a threshold, the firefighting mechanism releases the firefighting medium into the first accommodation cavity. The firefighting medium has good thermal insulation and fire suppression properties. The firefighting medium comes into contact with the battery to implement firefighting functions (extinguishing flames, cooling, or the like) for the battery. This reduces the risk of losses (personal injury and property loss) caused by battery fires, thereby improving reliability of the battery transportation protection device in transporting batteries. Additionally, the firefighting mechanism is connected to the case cover, so that when the battery is accommodated in the first accommodation cavity, the firefighting mechanism is located above the battery. In this way, when the battery undergoes thermal runaway, the firefighting medium can fall under gravity to come into contact with the battery, reducing the risk of losses caused by battery fires, thereby improving reliability of the battery transportation protection device in transporting batteries.

In some embodiments, the firefighting mechanism is located above the first accommodation cavity, and the firefighting mechanism is configured as capable of switching between a first state and a second state, where in the first state, the firefighting mechanism holds the firefighting medium; and in the second state, the firefighting mechanism releases the firefighting medium.

In the technical solution of the embodiments of this application, the firefighting mechanism is disposed above the first accommodation cavity, where in the first state, the firefighting mechanism holds the firefighting medium; and in the second state, the firefighting mechanism releases the firefighting medium, so that the firefighting medium can fall under gravity to come into contact with the battery, reducing the risk of losses caused by battery fires, thereby improving reliability of the battery transportation protection device in transporting batteries.

In some embodiments, the firefighting mechanism includes a first support plate, where the first support plate is configured as capable of rotating about a first axis, an extension direction of the first axis being perpendicular to the direction of gravity. In the first state, the first support plate is in a horizontal posture to hold the firefighting medium; and in the second state, the first support plate is in a vertical posture or an inclined posture to release the firefighting medium.

In the technical solution of the embodiments of this application, a rotatable first support plate is disposed to hold and release the firefighting medium, reducing the risk of losses caused by battery fires, thereby improving reliability of the battery transportation protection device in transporting batteries.

In some embodiments, the firefighting mechanism further includes a second support plate, where the second support plate is fixedly disposed relative to the case and in a horizontal posture to hold the firefighting medium, and the first support plate is rotatably connected to the second support plate. The detection component is disposed on the second support plate.

In the technical solution of the embodiments of this application, the second support plate is disposed to fix the first support plate, improving the convenience of disposing the first support plate. Additionally, the first support plate and the second support plate jointly hold the firefighting medium, improving the reliability of holding the firefighting medium. Additionally, the detection component is disposed on the second support plate. Since the second support plate is fixedly disposed on the case, the detection component is fixedly disposed, improving the installation reliability of the detection component.

In some embodiments, the environmental parameter includes at least one of temperature, combustible gas concentration, or air pressure.

Battery thermal runaway is accompanied by temperature increase, release of combustible gases (such as H2 and CO), and the like, and the released gases also change the air pressure within the first accommodation cavity. In the technical solution of the embodiments of this application, the detection component monitors at least one of temperature, combustible gas concentration, and air pressure, making it possible to quickly identify whether the transported battery undergoes thermal runaway. This reduces the risk of losses caused by battery fires, thereby improving reliability of the battery transportation protection device in transporting batteries.

In some embodiments, the firefighting medium includes flame-retardant microbeads.

In the technical solution of the embodiments of this application, flame-retardant microbeads have good heat absorption properties and can expand in high-temperature environments to form a physical flame-retardant layer, and flame-retardant microbeads are also highly lightweight. Using flame-retardant microbeads as the firefighting medium can reduce the risk of losses caused by battery fires, thereby improving reliability of the battery transportation protection device in transporting batteries and reducing the weight of the battery transportation protection device.

In some embodiments, the flame-retardant microbead includes at least one of glass microbead, ceramic microbead, or mineral microbead.

In the technical solution of the embodiments of this application, using at least one of glass microbead, ceramic microbead, or mineral microbead as the firefighting medium can reduce the risk of losses caused by battery fires, thereby improving reliability of the battery transportation protection device in transporting batteries and reducing the weight of the battery transportation protection device.

In some embodiments, the case cover includes a case cover frame, a first thermal insulation lining, and a second thermal insulation lining, where the case cover frame supports the pressure relief modules, the first thermal insulation lining and the second thermal insulation lining are both connected to the case cover frame, the first thermal insulation lining is disposed around the pressure relief modules, the second thermal insulation lining is disposed above the pressure relief modules, and the first thermal insulation lining and the second thermal insulation lining together enclose the second accommodation cavity.

In the technical solution of the embodiments of this application, the case cover frame is disposed to support the pressure relief modules, improving the reliability of disposing the pressure relief modules. The first thermal insulation lining and the second thermal insulation lining are disposed around and above the pressure relief modules, so that the case cover has good thermal insulation properties, reducing the impact of temperature on the outer surface of the case cover when high-temperature gas is discharged.

In some embodiments, a material of the first thermal insulation lining includes aerogel; and a material of the second thermal insulation lining includes aerogel.

In the technical solution of the embodiments of this application, aerogel has good thermal insulation performance and low density. Using aerogel as the material for the first thermal insulation lining and the second thermal insulation lining allows the case cover to have good thermal insulation properties, and reduces the weight of the battery transportation protection device.

In some embodiments, the case cover further includes a case cover outer plate, where the case cover outer plate is connected to the case cover frame, the case cover outer plate is disposed around the pressure relief modules, and the case cover outer plate is located on an outer side of the first thermal insulation lining.

In the technical solution of the embodiments of this application, the case cover outer plate is disposed on the outer side of the first thermal insulation lining, reducing the risk of damaging the first thermal insulation lining and affecting the thermal insulation performance of the case cover, thereby improving the reliability of the case cover.

In some embodiments, the first thermal insulation lining is provided with a first pressure relief port, the case cover outer plate is provided with a second pressure relief port corresponding to the first pressure relief port, and the first pressure relief port connects the second pressure relief port and the pressure relief channel.

In the technical solution of the embodiments of this application, the first pressure relief port and the second pressure relief port are disposed to connect the pressure relief channel, improving the convenience of discharging gas from the first accommodation cavity.

In some embodiments, the case cover further includes a case cover top plate, where the case cover top plate is connected to the case cover frame, and the case cover top plate is located on a side of the second thermal insulation lining facing away from the pressure relief modules.

In the technical solution of the embodiments of this application, the case cover top plate is disposed on the outer side of the second thermal insulation lining, reducing the risk of damaging the second thermal insulation lining and affecting the thermal insulation performance of the case cover, thereby improving the reliability of the case cover.

In some embodiments, the case body includes a side wall and a bottom wall, where the bottom wall is disposed opposite the case cover, the side wall is disposed around the bottom wall, a lower end of the side wall is connected to the bottom wall, and an upper end of the side wall is connected to the case cover. The side wall includes a side wall lining, a side wall shell, and a first flame-retardant insulation layer, where the first flame-retardant insulation layer is located between the side wall lining and the side wall shell.

In the technical solution of the embodiments of this application, the first flame-retardant insulation layer is disposed between the side wall lining and the side wall shell, so that the case body has good thermal insulation properties, reducing the impact of temperature on the outer surface of the case body during battery thermal runaway.

In some embodiments, the first flame-retardant insulation layer includes a first flame-retardant insulation sublayer and a second flame-retardant insulation sublayer, where the second flame-retardant insulation sublayer is located between the side wall lining and the first flame-retardant insulation sublayer. A thermal conductivity of the second flame-retardant insulation sublayer is less than a thermal conductivity of the first flame-retardant insulation sublayer.

In the technical solution of the embodiments of this application, the second flame-retardant insulation sublayer is disposed on the inner side of the first flame-retardant insulation sublayer, with the thermal conductivity of the second flame-retardant insulation sublayer being less than the thermal conductivity of the first flame-retardant insulation sublayer. This implements a gradient insulation where the thermal insulation performance of the case body increases from the outside to the inside, making the arrangement of the first flame-retardant insulation layer more reasonable.

In some embodiments, the first flame-retardant insulation sublayer includes aerogel, and the second flame-retardant insulation sublayer includes a fiber refractory material.

In the technical solution of the embodiments of this application, aerogel has low density, and fiber refractory material has low thermal conductivity. Aerogel is disposed as the first flame-retardant insulation sublayer and a fiber refractory material is disposed as the second flame-retardant insulation sublayer, implementing a gradient insulation where the thermal insulation performance of the case body increases from the outside to the inside. This makes the arrangement of the first flame-retardant insulation layer more reasonable, and reduces the weight of the battery transportation protection device.

In some embodiments, the bottom wall includes a bottom wall lining, a bottom wall shell, and a second flame-retardant insulation layer, where the second flame-retardant insulation layer is located between the bottom wall lining and the bottom wall shell.

In the technical solution of the embodiments of this application, the second flame-retardant insulation layer is disposed between the bottom wall lining and the bottom wall shell, so that the case body has good thermal insulation properties, reducing the impact of temperature on the outer surface of the case body during battery thermal runaway.

In some embodiments, the second flame-retardant insulation layer includes a third flame-retardant insulation sublayer and a fourth flame-retardant insulation sublayer, where the third flame-retardant insulation sublayer is located between the bottom wall lining and the fourth flame-retardant insulation sublayer. A thermal conductivity of the third flame-retardant insulation sublayer is less than a thermal conductivity of the fourth flame-retardant insulation sublayer.

In the technical solution of the embodiments of this application, the third flame-retardant insulation sublayer is disposed on the inner side of the fourth flame-retardant insulation sublayer, with the thermal conductivity of the third flame-retardant insulation sublayer being less than the thermal conductivity of the fourth flame-retardant insulation sublayer. This implements a gradient insulation where the thermal insulation performance of the case body increases from the outside to the inside, making the arrangement of the second flame-retardant insulation layer more reasonable.

In some embodiments, the third flame-retardant insulation sublayer includes a fiber refractory material, and the fourth flame-retardant insulation sublayer includes aerogel.

In the technical solution of the embodiments of this application, aerogel is disposed as the fourth flame-retardant insulation sublayer and a fiber refractory material is disposed as the third flame-retardant insulation sublayer, implementing a gradient insulation where the thermal insulation performance of the case body increases from the outside to the inside. This makes the arrangement of the second flame-retardant insulation layer more reasonable, and reduces the weight of the battery transportation protection device.

In some embodiments, the first flame-retardant insulation layer includes a first flame-retardant insulation sublayer and a second flame-retardant insulation sublayer, where the second flame-retardant insulation sublayer is located between the side wall lining and the first flame-retardant insulation sublayer. A material of the first flame-retardant insulation sublayer is the same as a material of the fourth flame-retardant insulation sublayer, and a thickness of the fourth flame-retardant insulation sublayer is greater than a thickness of the first flame-retardant insulation sublayer; and a material of the second flame-retardant insulation sublayer is the same as a material of the third flame-retardant insulation sublayer, and a thickness of the third flame-retardant insulation sublayer is greater than a thickness of the second flame-retardant insulation sublayer.

When a battery undergoes thermal runaway, the high-temperature substances generated gather at the bottom of the case body under the action of gravity. In the technical solution of the embodiments of this application, the material of the first flame-retardant insulation sublayer is set to be the same as the material of the fourth flame-retardant insulation sublayer, the material of the second flame-retardant insulation sublayer is set to be the same as the material of the third flame-retardant insulation sublayer, the thickness of the fourth flame-retardant insulation sublayer is set to be greater than the thickness of the first flame-retardant insulation sublayer, and the thickness of the third flame-retardant insulation sublayer is set to be greater than the thickness of the second flame-retardant insulation sublayer, making the thermal conductivity of the bottom wall lower than the thermal conductivity of the side wall. This allows the bottom wall to have good thermal insulation properties, reducing the impact of temperature on the outer surface of the bottom wall during battery thermal runaway.

In some embodiments, the case body further includes a case body frame, where the side wall and the bottom wall are both connected to the case body frame.

In the technical solution of the embodiments of this application, the case body frame is disposed to connect the side wall and the bottom wall, improving the reliability of disposing the pressure relief modules.

In some embodiments, the case cover includes a case cover frame, and the battery transportation protection device includes a first connection frame and a second connection frame, where the first connection frame is connected to the case body frame, the first connection frame encloses the first opening, and the second connection frame is connected to the case cover frame. An outer peripheral surface of one of the first connection frame and the second connection frame is a slanted surface, and an inner peripheral surface of the other is a slanted surface, the outer peripheral surface and the inner peripheral surface being cooperatively connected.

In the technical solution of the embodiments of this application, the slanted surface of the first connection frame and the slanted surface of the second connection frame cooperate to connect the case cover and the case body, limiting positions of the case cover and the case body in the horizontal direction, thereby improving reliability of the connection between the case cover and the case body. Additionally, the cooperation of the two slanted surfaces facilitates positioning and installation during the connection of the case cover and the case body.

In some embodiments, a first positioning portion is disposed on the top of the case, and a second positioning portion matching the first positioning portion is disposed on the bottom of the case, and configured for stacking two battery transportation protection devices along the direction of gravity.

In the technical solution of the embodiments of this application, the first positioning portion and the second positioning portion are disposed, facilitating stacking of two battery transportation protection devices, thereby improving the convenience of battery transportation.

In some embodiments, a height of the battery transportation protection device is h, satisfying 700 mm≤h≤1300 mm.

In the technical solution of the embodiments of this application, the height of the battery transportation protection device satisfying the above condition not only allows for accommodation of more batteries, but also facilitates placement of the battery transportation protection device on transportation vehicles for transportation.

For additional aspects and advantages of this application, some will be given in the following description, and some will become apparent in the following description or will be understood in the practice of this application.

BRIEF DESCRIPTION OF DRAWINGS

To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts.

SIGNS

Figure 1:
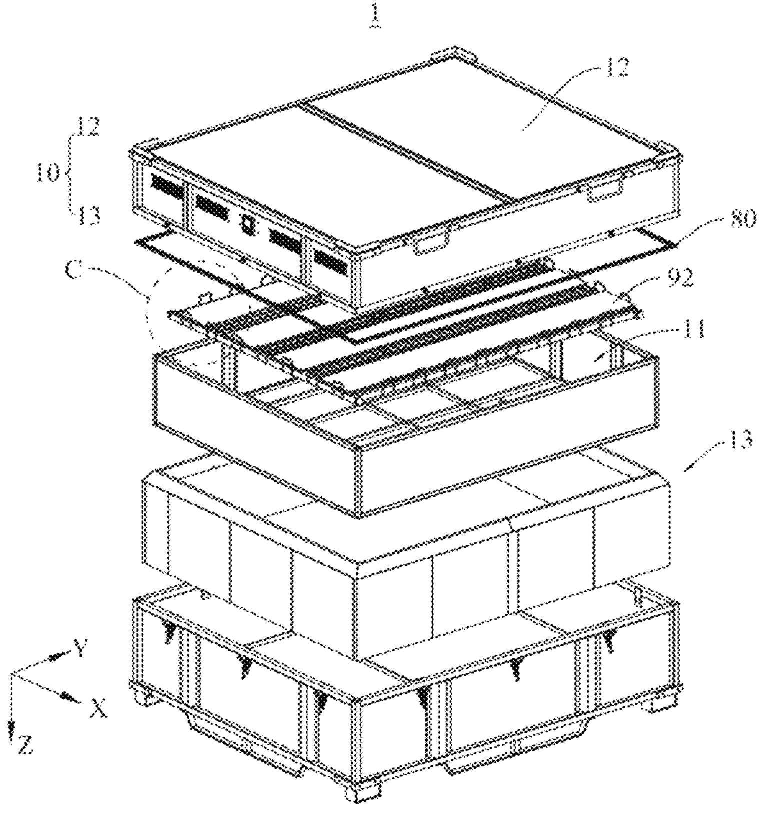
FIG. 1 is a structural exploded view of a battery transportation protection device according to some embodiments of this application.

1. battery transportation protection device; 10. case; 11. first accommodation cavity; 12. case cover; 121. pressure relief channel; 122. second accommodation cavity; 123. case cover frame; 124. first thermal insulation lining; 1241. first pressure relief port; 125. second thermal insulation lining; 126. case cover outer plate; 1261. second pressure relief port; 127. case cover top plate; 128. first lifting portion; 13. case body; 131. side wall; 1311. side wall lining; 1312. side wall shell; 1313. first flame-retardant insulation layer; 1313*a*. first flame-retardant insulation sublayer; 1313*b*. second flame-retardant insulation sublayer; 132. bottom wall; 1321. bottom wall lining; 1322. bottom wall shell; 1323. second flame-retardant insulation layer; 1323*a*. third flame-retardant insulation sublayer; 1323*b*. fourth flame-retardant insulation sublayer; 133. first opening; 134. case body frame; 20. detection component; 30. firefighting mechanism; 31. communication hole; 32. first support plate; 33. first locking member; 34. driving member; 35. second support plate; 36. second opening; 37. linkage shaft; 38. mounting seat; 39. second locking member; 391. locking hole; 40. pressure relief module; 41. smoke inlet; 42. smoke outlet; 43. housing; 44. filter; 441. stainless steel fiber filter; 442. glass fiber filter; 443. ceramic fiber filter; 45. guide plate; 50. firefighting medium; 60. gas collection cover; 70. first connection frame; 71. second connection frame; 80. sealing member; 90. latch; 91. bracket; 92. tray; 921. strap loop; 922. tray body; 923. pallet; 93. locking mechanism; 94. first positioning portion; 941. second positioning portion; 95. forklift hole; O. first axis; X. first direction; Y second direction; and Z. direction of gravity.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by persons skilled in the art to which this application relates. The terms used in the specification of this application are intended to merely describe the specific embodiments rather than to limit this application. The terms "include", "comprise", and any variations thereof in the specification, claims, and brief description of drawings of this application are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in this specification does not necessarily refer to the same embodiment or an independent or alternative embodiment that is exclusive of other embodiments. It is explicitly or implicitly understood by persons skilled in the art that the embodiments described herein may be combined with other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is only an associative relationship for describing associated objects, indicating that three relationships may be present. For example, A and/or B may indicate the following three cases: presence of only A; presence of both A and B; and presence of only B. In addition, the character "/" in this application generally indicates an "or" relationship between the contextually associated objects. In this disclosure, unless otherwise specified, phrases like "at least one of A, B, and C" and "at least one of A, B, or C" both mean only A, only B, only C, or any combination of A, B, and C.

In this application, "a plurality of" means more than two (inclusive). Similarly, "a plurality of groups" means more than two (inclusive) groups, and "a plurality of pieces" means more than two (inclusive) pieces.

The battery mentioned in the embodiments of this application may be a battery apparatus. The battery apparatus may include one or more battery cell assemblies for providing voltage and capacity. The battery cell assembly may include a plurality of battery cells, and the plurality of battery cells are connected in series, in parallel, or in series-parallel via a busbar component.

In some embodiments, the battery cell assembly is typically formed by arranging a plurality of battery cells. For example, the battery cell assembly may be a battery module, where the battery module is an independent module formed by arranging and fixing a plurality of battery cells. For example, the battery module may be formed by bundling a plurality of battery cells with straps.

In some embodiments, the battery may be a battery pack. The battery pack includes a battery case and one or more battery cell assemblies which are accommodated within the battery case.

For example, the battery cell assembly may be a battery module, and the battery cell assembly may be accommodated in the battery case by fixing the battery module in the battery case.

For example, the battery cell assembly may alternatively be accommodated in the battery case by directly fixing a plurality of battery cells in the battery case.

For example, the battery case may include a first battery case and a second battery case. The first battery case and the second battery case are engaged together to form a closed space inside the battery case to accommodate the battery cell assembly. The term "closed" herein refers to covering or closing, which may be sealed or unsealed. The first battery case may be a top cover or a bottom plate.

For example, the battery case may include a top cover, a frame, and a bottom plate. The top cover and the bottom plate are respectively connected to the frame, forming a closed space inside the battery case to accommodate the battery cell assembly.

In the embodiments of this application, the battery cell may be a secondary battery. The secondary battery is a battery cell that can be charged after discharge to activate active materials for continuous use.

The battery cell may be, but is not limited to, a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead storage battery, or the like.

For the development of battery technologies, many design factors need to be considered, for example, performance parameters such as energy density, cycle life, discharge capacity, and charge and discharge rate. Additionally, how the reliability of battery transportation protection devices in transporting batteries during battery transportation is also one of the key factors to consider.

Batteries are typically transported using battery transportation protection devices. During transportation, batteries may catch fire due to certain reasons, such as thermal runaway or collisions of batteries. When a battery catches fire, it generates gas. The accumulation of the gas inside the battery transportation protection device increases the air pressure within the battery transportation protection device. This poses risks such as explosion or the battery transportation protection device being forced open, resulting in losses and compromising the reliability of the battery transportation protection device in transporting batteries.

In view of this, to address the issue of battery fires affecting the reliability of battery transportation protection devices in transporting batteries, an embodiment of this application provides a battery transportation protection device. The battery transportation protection device includes a case, where the case includes a case cover and a case body. The case body has a first opening, and the case cover covers the first opening to define, together with the case body, a first accommodation cavity for accommodating a battery. A pressure relief channel is formed inside the case cover, and the pressure relief channel is in communication with the first accommodation cavity and configured to discharge gas from the first accommodation cavity.

The pressure relief channel is disposed to discharge gas generated by the battery, reducing the risk of excessive air pressure in the first accommodation cavity, thereby improving reliability of the battery transportation protection device in transporting batteries. Additionally, the pressure relief channel is disposed inside the case cover, that is, the pressure relief channel is disposed above the first accommodation cavity, so that the pressure relief channel shares the same footprint as the case body, reducing the dimensions of the battery transportation protection device in the horizontal direction and facilitating the spatial arrangement of the battery transportation protection device during transportation.

The technical solutions described in the embodiments of this application can be used for battery transportation, such as normal battery transportation or recycling of used batteries.

Figure 2:
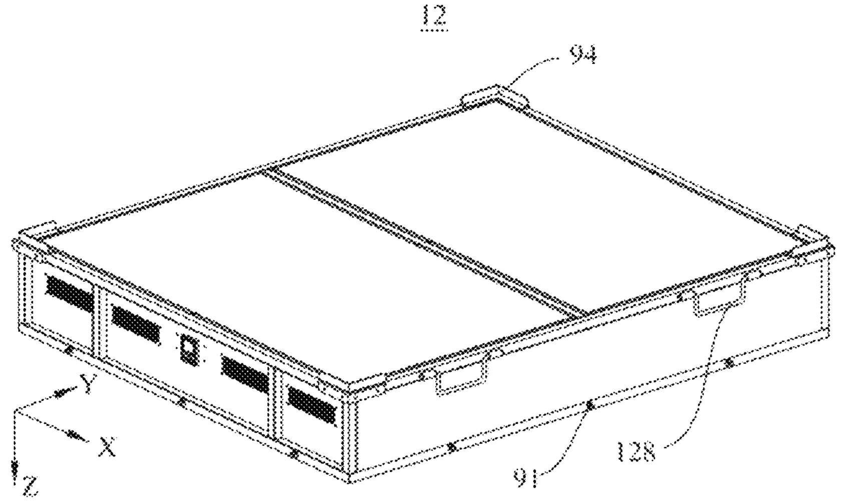
FIG. 2 is a schematic diagram of a case cover according to some embodiments of this application.
Figure 3:
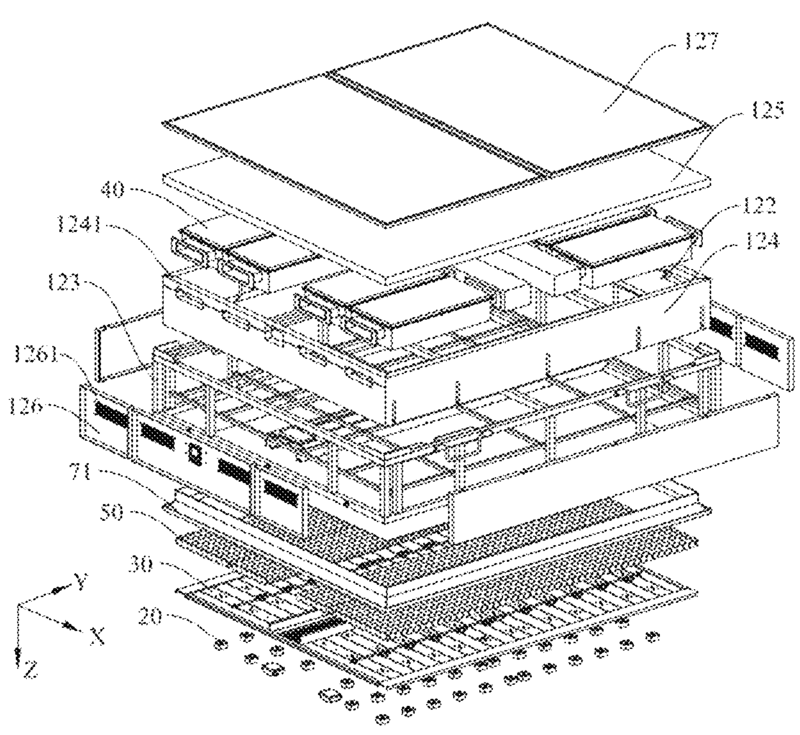
FIG. 3 is a structural exploded view of a case cover according to some embodiments of this application.
Figure 8:
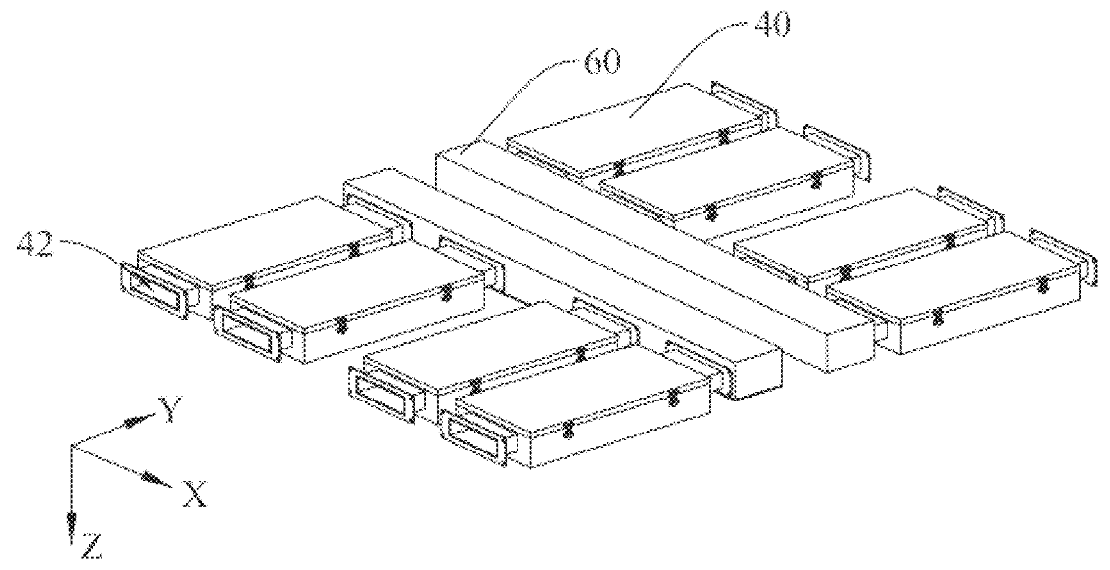
FIG. 8 is a schematic diagram of pressure relief modules according to some embodiments of this application.
Figure 9:
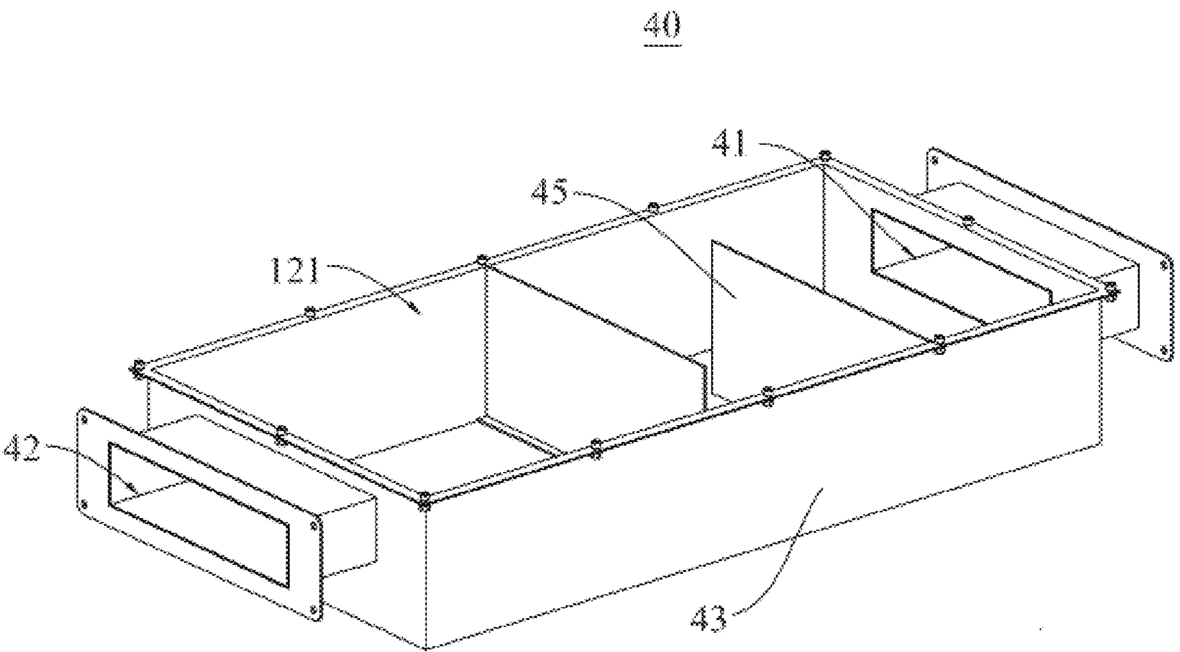
FIG. 9 is a schematic structural diagram of a pressure relief module according to some embodiments of this application.

Referring to FIG. 1 to FIG. 3, FIG. 8, and FIG. 9, FIG. 1 is a structural exploded view of a battery transportation protection device according to some embodiments of this application; FIG. 2 is a schematic diagram of a case cover according to some embodiments of this application; FIG. 3 is a structural exploded view of a case cover according to some embodiments of this application; FIG. 8 is a schematic diagram of pressure relief modules according to some embodiments of this application; and FIG. 9 is a schematic structural diagram of a pressure relief module according to some embodiments of this application. In FIG. 9, part of the housing of the pressure relief module is hidden to clearly show the pressure relief channel. An embodiment of this application provides a battery transportation protection device 1. The battery transportation protection device 1 includes a case 10, where the case 10 includes a case cover 12 and a case body 13. The case body 13 has a first opening 133, and the case cover 12 covers the first opening 133 to define, together with the case body 13, a first accommodation cavity 11 for accommodating a battery. A pressure relief channel is formed inside the case cover 12, and the pressure relief channel is in communication with the first accommodation cavity 11 and configured to discharge gas from the first accommodation cavity 11.

In some embodiments, an outer shell of the case 10 may be made of metal, or both an outer shell and an inner liner of the case 10 may be made of metal.

Additionally, both the outer shell and the inner liner of the case 10 may be made of metal, and a thermal insulation material may be disposed between the outer shell and the inner liner.

A battery is prone to thermal runaway when the battery is in a high-temperature environment or the battery is subjected to collisions, causing the battery to catch fire. In some embodiments, the battery may be disposed in the first accommodation cavity 11 of the case 10 to protect the battery, reducing the risk of collisions with the external environment during the battery transportation and isolating the battery from external temperature influences, thereby reducing the risk of battery thermal runaway.

In some embodiments, when the battery undergoes thermal runaway, the case 10 accommodates the battery in the first accommodation cavity 11. When the battery catches fire due to thermal runaway, the case 10 can also isolate the battery from the external environment, reducing the risk of property damage and personal injury caused by the battery. In a case that a plurality of battery transportation protection devices 1 transport batteries together, if a battery in one battery transportation protection device 1 catches fire, the risk of the battery fire affecting batteries in other battery transportation protection devices 1 can also be reduced, reducing the risk of further spread of losses.

In some embodiments, the first opening 133 may be formed at the top of the case body 13. The battery enters the case body 13 through the first opening 133, and the case cover 12 covers the first opening 133 to accommodate the battery in the first accommodation cavity 11.

In some embodiments, the pressure relief channel 121 may connect the first accommodation cavity 11 to the exterior of the case 10.

In some embodiments, the pressure relief channel 121 connecting the first accommodation cavity 11 to the exterior of the case 10 may be formed inside the case cover 12, either by integral formation or by machining the case cover 12 and then milling the pressure relief channel 121.

In some embodiments, an accommodation cavity may be formed inside the case cover 12, a gas discharge component is disposed in the accommodation cavity, a pressure relief channel 121 is disposed inside the gas discharge component, and the pressure relief channel 121 connects the first accommodation cavity 11 to the exterior of the case 10.

In the technical solution of the embodiments of this application, battery thermal runaway is typically accompanied by gas generation. The accumulation of gases within the first accommodation cavity 11 leads to an increase in air pressure within the first accommodation cavity 11, which poses risks of causing losses due to explosion or forceful ejection of the case cover 12. The pressure relief channel is disposed to discharge gas generated by the battery, reducing the risk of excessive air pressure in the first accommodation cavity 11, thereby improving reliability of the battery transportation protection device 1 in transporting batteries. Additionally, the pressure relief channel is disposed inside the case cover 12, that is, the pressure relief channel is disposed above the first accommodation cavity 11, so that the pressure relief channel shares the same footprint as the case body 13, reducing the dimensions of the battery transportation protection device 1 in the horizontal direction and facilitating the spatial arrangement of the battery transportation protection device 1 during transportation.

Referring to FIG. 1 to FIG. 3, FIG. 8, and FIG. 9, in some embodiments, a second accommodation cavity 122 is formed inside the case cover 12, and the battery transportation protection device 1 further includes a pressure relief module 40, where the pressure relief module 40 is disposed in the second accommodation cavity 122, the pressure relief module 40 is provided with a smoke inlet 41 and a smoke outlet 42 at two ends, respectively, the pressure relief channel 121 is formed inside the pressure relief module 40, and the pressure relief channel 121 connects the smoke inlet 41 and the smoke outlet 42.

In some embodiments, a material of the pressure relief module 40 may be metal.

In some embodiments, the pressure relief module 40 may be provided with a smoke inlet 41 and a smoke outlet 42 at two ends, and a pressure relief channel 121 is formed inside the pressure relief module 40, where the smoke inlet 41 connects the first accommodation cavity 11 to the pressure relief channel 121, and the smoke outlet 42 connects the pressure relief channel 121 to the exterior of the case 10. When the battery catches fire, the generated gas is discharged from the case 10 by flowing sequentially from the first accommodation cavity 11 through the smoke inlet 41, the pressure relief channel 121, and the smoke outlet 42.

In some embodiments, the pressure relief module 40 may have a pressure relief channel 121 enclosed by several plates, or the pressure relief module 40 may be a solid metal block with the pressure relief channel 121 machined inside.

In the technical solution of the embodiments of this application, the pressure relief module is disposed inside the case cover 12 to define the pressure relief channel, reducing the risk of excessive air pressure in the first accommodation cavity 11, thereby improving reliability of the battery transportation protection device 1 in transporting batteries.

Referring to FIG. 3 and FIG. 8, in some embodiments, the pressure relief module 40 is provided in plurality, the plurality of pressure relief modules 40 are arranged in two rows, the two rows of pressure relief modules 40 are spaced apart along a second direction Y, and the plurality of pressure relief modules 40 in each row of the pressure relief modules 40 are arranged along a first direction X, the first direction X, the second direction Y, and a direction of gravity Z being mutually perpendicular. The smoke inlets 41 of each row of pressure relief modules 40 are disposed at an end close to the other row of pressure relief modules 40, and the smoke outlets 42 of each row of pressure relief modules 40 are disposed at an end far from the other row of pressure relief modules 40.

In some embodiments, the first direction may be represented by the letter X in the figures, the second direction may be represented by the letter Y in the figures, and the direction of gravity may be represented by the letter Z in the figures.

In some embodiments, the direction of gravity Z may be parallel to a height direction of the case 10, the first direction X may be parallel to a length direction of the case 10, and the second direction Y may be parallel to a width direction of the case 10.

Alternatively, the direction of gravity Z may be parallel to a height direction of the case 10, the first direction X may be parallel to a width direction of the case 10, and the second direction Y may be parallel to a length direction of the case 10.

In some embodiments, the numbers of pressure relief modules 40 in the two rows of pressure relief modules 40 may be the same or different.

In some embodiments, the numbers of pressure relief modules 40 in the two rows of pressure relief modules 40 are the same. When the two rows of pressure relief modules 40 are projected onto a projection plane perpendicular to the second direction Y, orthographic projections of the two rows of pressure relief modules 40 overlap.

In the second direction Y, each pressure relief module 40 in one row of pressure relief modules 40 is in one-to-one correspondence with each pressure relief module 40 in the other row of pressure relief modules 40.

Taking two corresponding pressure relief modules 40 as an example, the smoke inlet 41 of one pressure relief module 40 is disposed at an end facing the other pressure relief module 40, and the smoke outlet 42 of one pressure relief module 40 is disposed at an end facing away from the other pressure relief module 40.

When the battery catches fire, the generated smoke and gas enter the second accommodation cavity 122 from the first accommodation cavity 11 and are discharged from the two pressure relief modules 40 between the two pressure relief modules 40.

Similarly, when the battery catches fire, the generated smoke and gas enter the second accommodation cavity 122 from the first accommodation cavity 11 and are discharged from the two pressure relief modules 40 between the two rows of pressure relief modules 40.

In the technical solution of the embodiments of this application, the smoke inlets 41 of the two rows of pressure relief modules 40 face each other, so that gas in the first accommodation cavity 11 can be discharged simultaneously from the two rows of pressure relief modules 40 from the middle. This improves the efficiency of gas discharge, and reduces the risk of excessive air pressure in the first accommodation cavity 11, thereby improving reliability of the battery transportation protection device 1 in transporting batteries.

Referring to FIG. 3, FIG. 8, and FIG. 9, in some embodiments, the battery transportation protection device 1 further includes a gas collection cover 60, where the gas collection cover 60 is disposed between the two rows of pressure relief modules 40 and connected to the plurality of pressure relief modules 40. An internal space of the gas collection cover 60 connects the first accommodation cavity 11 and the plurality of smoke inlets 41.

In some embodiments, a material of the gas collection cover 60 may be metal.

In some embodiments, one gas collection cover 60 may be provided, where the gas collection cover 60 has a cavity with a plurality of openings, one opening communicating with the first accommodation cavity 11, and the other openings communicating with the smoke inlets 41 of the two rows of pressure relief modules 40, respectively.

In some embodiments, two gas collection covers 60 may be provided, and the two gas collection covers 60 are connected to the two rows of pressure relief modules 40, respectively. In some embodiments, the gas collection cover 60 may have a plurality of openings, one opening communicating with the gap between the two rows of pressure relief modules 40, and the other openings communicating with the smoke inlets 41 of the pressure relief modules 40, respectively.

The pressure relief modules 40 arranged along the second direction Y form one row of pressure relief modules 40, where a gap may be present between two adjacent pressure relief modules 40. After entering the second accommodation cavity 122 from the first accommodation cavity 11, gas may disperse into the gap between two adjacent pressure relief modules 40, affecting gas discharge. Therefore, with the gas collection cover 60 provided, when the battery catches fire, gas from the first accommodation cavity 11 enters the gap between the two rows of pressure relief modules 40 and then gathers in the cavity of the gas collection cover 60, or directly gathers in the cavity of the gas collection cover 60 from the first accommodation cavity 11, and is discharged through the pressure relief channel 121, reducing the risk of gas dispersing into the gap between two adjacent pressure relief modules 40 and affecting gas discharge.

In the technical solution of the embodiments of this application, the gas collection cover 60 is disposed to connect the first accommodation cavity 11 and the smoke inlets 41, so that gas from the first accommodation cavity 11 can be collected in the gas collection cover 60, facilitating the discharge of gas from the first accommodation cavity 11 by the pressure relief modules 40. This reduces the risk of excessive air pressure in the first accommodation cavity 11, thereby improving reliability of the battery transportation protection device 1 in transporting batteries.

Referring to FIG. 8, in some embodiments, two gas collection covers 60 are provided, and the two gas collection covers 60 are connected to the two rows of pressure relief modules 40, respectively.

In some embodiments, two gas collection covers 60 may be provided, and the two gas collection covers 60 are connected to the two rows of pressure relief modules 40, respectively. One gas collection cover 60 connects the gap between the two rows of pressure relief modules 40 and the smoke inlets 41 of that row of pressure relief modules 40.

In the technical solution of the embodiments of this application, two gas collection covers 60 are disposed to respectively connect to the two rows of pressure relief modules 40, that is, the two rows of pressure relief modules 40 are not directly connected, allowing for individual maintenance of the two rows of pressure relief modules 40, thereby improving the maintenance convenience of the pressure relief modules 40.

Figure 10:
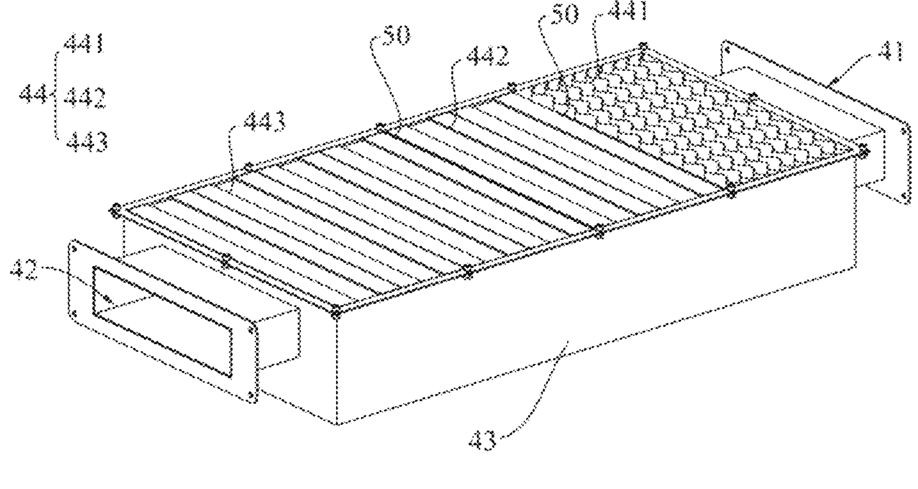
FIG. 10 is a schematic diagram of a filter according to some embodiments of this application.

Referring to FIG. 8, FIG. 9, and FIG. 10, FIG. 10 is a schematic diagram of a filter according to some embodiments of this application. In some embodiments, the pressure relief module 40 includes a housing 43 and a filter 44, where an internal space of the housing 43 forms the pressure relief channel 121, and the filter 44 is disposed within the pressure relief channel 121.

In some embodiments, the pressure relief module 40 includes a housing 43, and a material of the housing 43 may be metal.

In some embodiments, the housing 43 may be formed by welding a plurality of plates or by stamping or milling a solid piece.

In some embodiments, the pressure relief channel 121 is formed inside the housing 43, and the filter 44 is disposed within the pressure relief channel 121. The filter 44 may be a filter mesh, and the filter mesh may also be provided with a medium for settling and decomposing impurities.

In the technical solution of the embodiments of this application, when a battery undergoes thermal runaway and generates gas, the gas typically contains toxic gases and solid impurities from the battery. The filter 44 is disposed in the pressure relief channel 121 to filter the gas in the pressure relief channel 121, reducing the risk of environmental pollution and losses caused by the discharged gas.

Referring to FIG. 10, in some embodiments, the filter 44 includes a stainless steel fiber filter 441, a glass fiber filter 442, and a ceramic fiber filter 443, where along a gas flow direction in the pressure relief channel 121, the stainless steel fiber filter 441, the glass fiber filter 442, and the ceramic fiber filter 443 are arranged in sequence.

In some embodiments, along the gas flow direction in the pressure relief channel 121, that is, a direction from the smoke inlet 41 to the smoke outlet 42, the stainless steel fiber filter 441, the glass fiber filter 442, and the ceramic fiber filter 443 are arranged in sequence, so that when the battery catches fire, the gas passes through the stainless steel fiber filter 441, the glass fiber filter 442, and the ceramic fiber filter 443 in sequence.

The gas generated during battery thermal runaway has a high temperature, and the stainless steel fiber filter can withstand high temperatures. In the technical solution of the embodiments of this application, the stainless steel fiber filter 441, the glass fiber filter 442, and the ceramic fiber filter 443 are arranged in sequence along the gas flow direction in the pressure relief channel 121 to filter toxic gases and solid impurities from the battery, thereby improving the reliability of the filter 44, and reducing the impact of the discharged gas on the external environment.

Referring to FIG. 8 to FIG. 10, in some embodiments, the pressure relief module 40 further includes a guide plate 45, where the guide plate 45 is disposed within the housing 43.

In some embodiments, the guide plate 45 is disposed within the housing 43 to reduce the cross-section of the pressure relief channel 121, thereby reducing the gas flow rate.

In some embodiments, the guide plate 45 may be provided in plurality, where the plurality of guide plates 45 are spaced apart along a direction from the smoke inlet 41 to the smoke outlet 42, and partition the pressure relief channel 121 into cavities for accommodating the filter 44, facilitating the arrangement of the filter 44.

The guide plate 45 is disposed within the housing 43, and a notch may be formed between the guide plate 45 and the inner wall of the housing 43, allowing gas to flow through the notch. Between two adjacent guide plates 45, the notches formed between the guide plates 45 and the inner wall of the housing 43 may be staggered. For example, one guide plate 45 forms a notch with the housing 43 at one end in the first direction X, and the other guide plate 45 forms a notch with the housing 43 at the other end in the first direction X, extending the gas flow path. This increases the contact time between the gas and the filter 44, reducing the risk of the discharged gas polluting the environment and causing losses.

In the technical solution of the embodiments of this application, the guide plate 45 is disposed within the housing 43, reducing the flow rate of gas in the pressure relief channel 121, and increasing the contact time between the gas passing through the pressure relief channel 121 and the filter 44. This improves the filtration effect of the filter 44 and reduces the impact of the discharged gas on the external environment.

Figure 4:
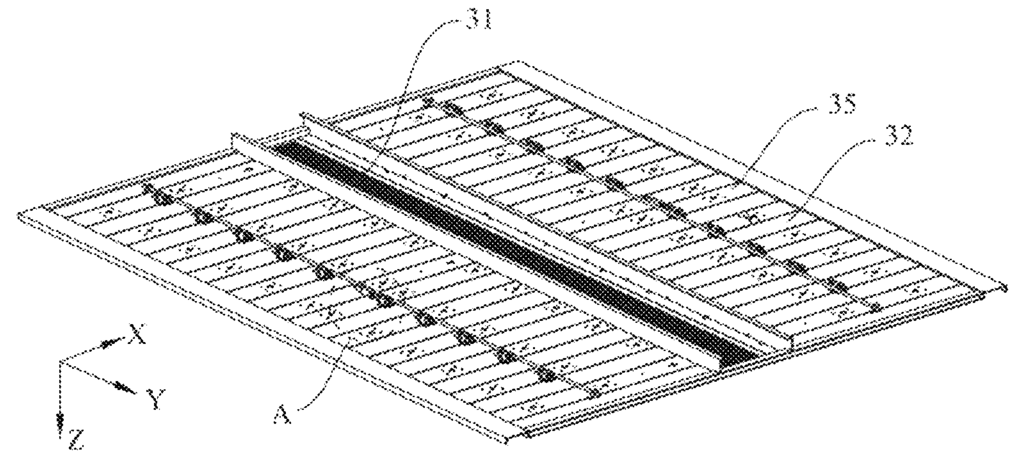
FIG. 4 is a schematic diagram of a firefighting mechanism in a first state according to some embodiments of this application.
Figure 5:
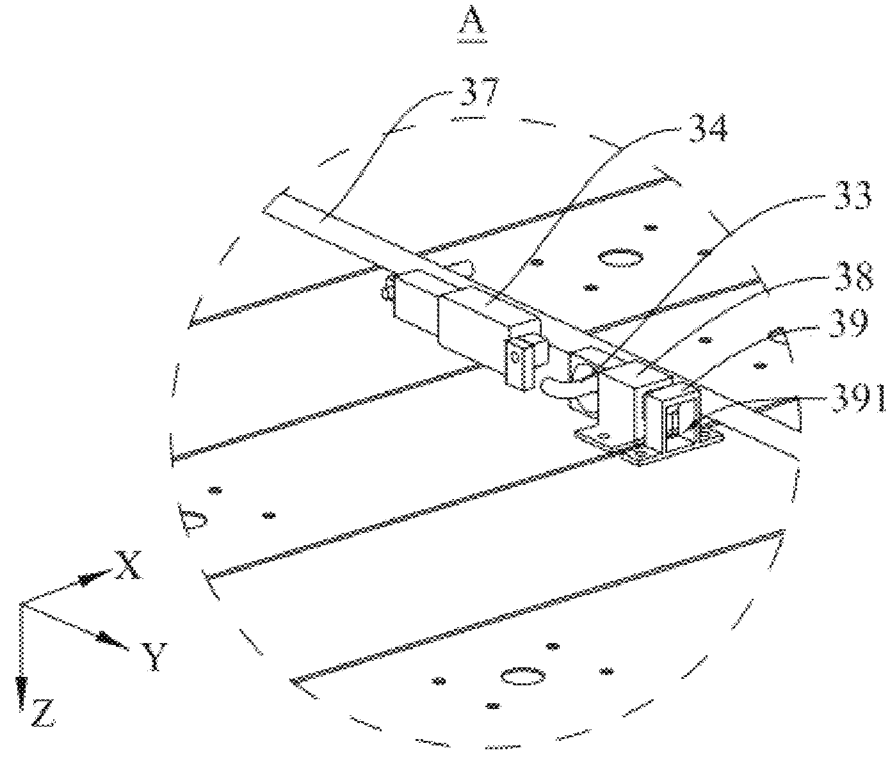
FIG. 5 is an enlarged view of position A in FIG. 4.
Figure 6:
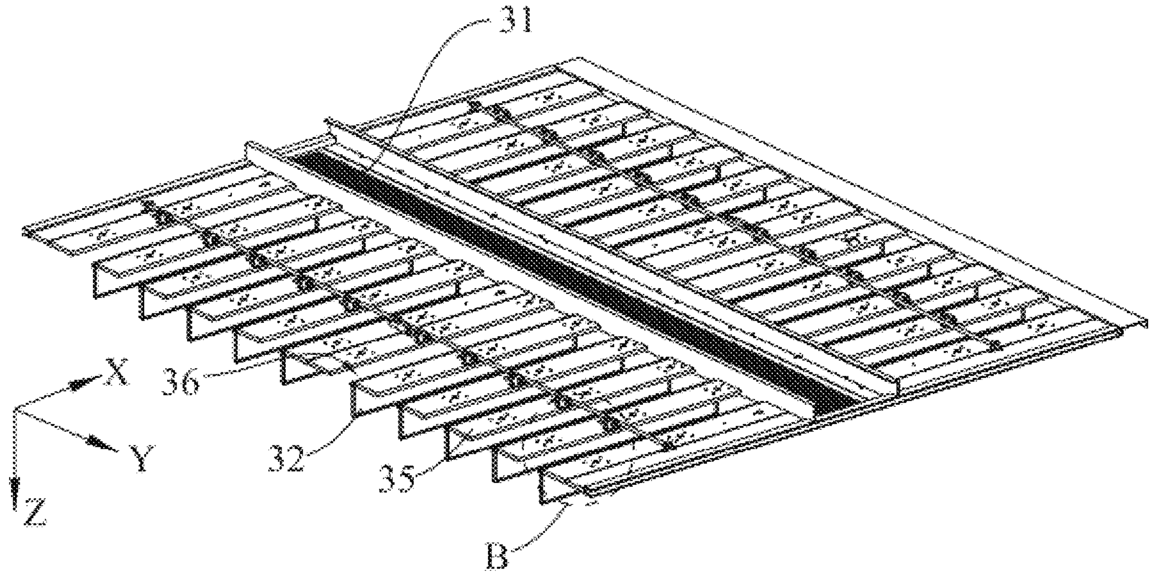
FIG. 6 is a schematic diagram of a firefighting mechanism in a second state according to some embodiments of this application.
Figure 7:
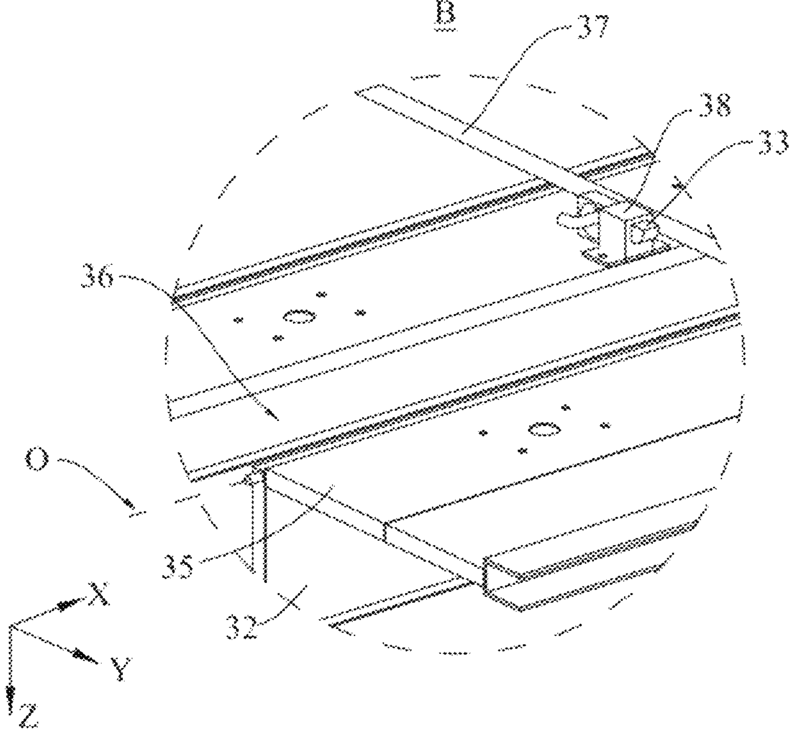
FIG. 7 is an enlarged view of position B in FIG. 6.

Referring to FIG. 1 to FIG. 3 and FIG. 4 to FIG. 7, FIG. 4 is a schematic diagram of a firefighting mechanism in a first state according to some embodiments of this application, FIG. 5 is an enlarged view of position A in FIG. 4, FIG. 6 is a schematic diagram of a firefighting mechanism in a second state according to some embodiments of this application, and FIG. 7 is an enlarged view of position B in FIG. 6. In some embodiments, the battery transportation protection device 1 further includes a detection component 20 and a firefighting mechanism 30. The detection component 20 is disposed on the case 10, where the detection component 20 is configured to detect an environmental parameter within the first accommodation cavity 11. The firefighting mechanism 30 is connected to the case cover 12, where the firefighting mechanism 30 is configured to release a firefighting medium 50 into the first accommodation cavity 11 when the environmental parameter exceeds a threshold.

In some embodiments, the battery transportation protection device 1 may include a detection component 20 and a firefighting mechanism 30. The detection component 20 is configured to detect whether the battery in the case 10 undergoes thermal runaway. When thermal runaway of the battery in the case 10 is detected, the firefighting mechanism 30 can be controlled to release the firefighting medium 50 into the first accommodation cavity 11, thereby implementing fire extinguishing or suppression.

The detection component 20 may include a controller that can directly control the firefighting mechanism 30 based on detected data. Alternatively, the battery transportation protection device 1 may include a controller, and the controller receives detected data from the detection component 20 and controls the firefighting mechanism 30 based on the detected data.

In some embodiments, the detection component 20 may be a sensor capable of detecting temperature, air pressure, gas concentration, or the like within the first accommodation cavity 11 to determine, based on the detected data, whether the battery has caught fire.

In some embodiments, the firefighting mechanism 30 may release the firefighting medium 50 into the first accommodation cavity 11 by using a power source (such as a motor or a pump) to spray the firefighting medium 50 into the first accommodation cavity 11, allowing the firefighting medium 50 to contact the battery.

Alternatively, the firefighting mechanism 30 may release the held firefighting medium 50, so that the firefighting medium 50 enters the first accommodation cavity 11 under gravity, allowing the firefighting medium 50 to come into contact with the battery.

In some embodiments, the firefighting medium 50 may be a liquid, such as water; the firefighting medium 50 may be a solid, such as sand; or the firefighting medium 50 may be a gas, such as carbon dioxide.

In some embodiments, the firefighting mechanism 30 is connected to the case cover 12, so that the firefighting mechanism 30 is located above the first accommodation cavity 11, allowing the firefighting mechanism 30 to release the firefighting medium 50 above the battery when the battery is accommodated in the first accommodation cavity 11.

In the technical solution of the embodiments of this application, during battery transportation, the battery is accommodated in the first accommodation cavity 11 of the case 10. When the battery undergoes thermal runaway or catches fire, temperature may increase, combustible gases may be generated, and air pressure within the first accommodation cavity 11 may increase. The detection component 20 is disposed to detect an environmental parameter (temperature, combustible gas concentration, air pressure, or the like) within the first accommodation cavity 11, and when the environmental parameter detected by the detection component 20 exceeds a threshold, the firefighting mechanism 30 releases the firefighting medium 50 into the first accommodation cavity 11. The firefighting medium 50 has good thermal insulation and fire suppression properties. The firefighting medium 50 comes into contact with the battery to implement firefighting functions (extinguishing flames, cooling, or the like) for the battery. This reduces the risk of losses (personal injury and property loss) caused by battery fires, thereby improving reliability of the battery transportation protection device 1 in transporting batteries. Additionally, the firefighting mechanism 30 is connected to the case cover 12, so that when the battery is accommodated in the first accommodation cavity 11, the firefighting mechanism 30 is located above the battery. In this way, when the battery undergoes thermal runaway, the firefighting medium 50 can fall under gravity to come into contact with the battery, reducing the risk of losses caused by battery fires, thereby improving reliability of the battery transportation protection device 1 in transporting batteries.

During use of the detection component 20, the detection component 20 requires a power source to provide driving power. When the battery catches fire, the temperature in the first accommodation cavity 11 is relatively high, so the power source is disposed in the second accommodation cavity 122. The temperature of the gas entering the second accommodation cavity 122 is relatively high. To reduce the impact of the gas on the power source, the gas collection cover 60, the inner wall surface of the second accommodation cavity 122, and the pressure relief modules 40 partition off an accommodation space in the second accommodation cavity 122. The accommodation space is not in communication with the gap between the two rows of pressure relief modules 40, reducing the impact of gas on the power source.

Referring to FIG. 1 to FIG. 7, in some embodiments, the firefighting mechanism 30 is located above the first accommodation cavity 11, and the firefighting mechanism 30 is configured as capable of switching between a first state and a second state, where in the first state, the firefighting mechanism 30 holds the firefighting medium 50; and in the second state, the firefighting mechanism 30 releases the firefighting medium 50.

In some embodiments, the firefighting mechanism 30 may be located above the first accommodation cavity 11, so that when the firefighting mechanism 30 releases the firefighting medium 50, the firefighting medium 50 can better contact the battery under the action of gravity.

Additionally, during a battery fire, the fire typically spreads upward. The firefighting mechanism 30 is located above the first accommodation cavity 11, that is, when the firefighting mechanism 30 releases the firefighting medium 50, the firefighting medium 50 contacts the upper part of the battery, implementing better fire extinguishing or suppression.

In the technical solution of the embodiments of this application, the firefighting mechanism 30 is disposed above the first accommodation cavity 11, where in the first state, the firefighting mechanism 30 holds the firefighting medium 50; and in the second state, the firefighting mechanism 30 releases the firefighting medium 50, so that the firefighting medium 50 can fall under gravity to come into contact with the battery, reducing the risk of losses caused by battery fires, thereby improving reliability of the battery transportation protection device 1 in transporting batteries.

Referring to FIG. 3 to FIG. 7, in some embodiments, the firefighting mechanism 30 includes a first support plate 32, where the first support plate 32 is configured as capable of rotating about a first axis O, an extension direction of the first axis O being perpendicular to the direction of gravity Z. In the first state, the first support plate 32 is in a horizontal posture to hold the firefighting medium 50; and in the second state, the first support plate 32 is in a vertical posture or an inclined posture to release the firefighting medium 50.

In some embodiments, the firefighting mechanism 30 may include a fixed shaft, and the first support plate 32 may rotate about the fixed shaft, the first axis O being a central axis of the fixed shaft.

In some embodiments, the firefighting mechanism 30 may include a rotating shaft, and the rotating shaft may drive the first support plate 32 to rotate, the first axis O being a central axis of the rotating shaft.

In some embodiments, the first axis may be represented by the letter O in the figures.

In some embodiments, the extension direction of the first axis O may be parallel to the first direction X.

In some embodiments, when the data detected by the detection component 20 indicates that the battery does not catch fire, the first support plate 32 is in the first state, that is, the first support plate 32 extends along a horizontal direction, and the firefighting medium 50 is located above the first support plate 32, held by the first support plate 32.

When the data detected by the detection component 20 indicates that the battery has caught fire, the first support plate 32 rotates about the first axis O, causing the first support plate 32 to tilt or the first support plate 32 to extend along the direction of gravity Z, releasing the firefighting medium 50.

In the technical solution of the embodiments of this application, a rotatable first support plate 32 is disposed to hold and release the firefighting medium 50, reducing the risk of losses caused by battery fires, thereby improving reliability of the battery transportation protection device 1 in transporting batteries.

Referring to FIG. 3 to FIG. 7, in some embodiments, the firefighting mechanism 30 further includes a first locking member 33 and a driving member 34, where the first locking member 33 is configured to lock the first support plate 32 in the horizontal posture, and the driving member 34 is configured to drive the first locking member 33 to move to unlock the first support plate 32.

When the first support plate 32 is disposed in the horizontal posture, the first support plate 32 tends to tilt downward due to gravity. In some embodiments, the firefighting mechanism 30 may include a first locking member 33, where when the firefighting mechanism 30 is in the first state, the first locking member 33 limits the first support plate 32 so that the first support plate 32 maintains the horizontal posture.

The limiting method may be: the first locking member 33 being located below the first support plate 32 to support the first support plate 32, preventing the first support plate 32 from tilting downward; or the first locking member 33 holding the first support plate 32, preventing the first support plate 32 from tilting downward.

When the firefighting mechanism 30 needs to switch from the first state to the second state, the driving member 34 can drive the first locking member 33 to move, so that the first locking member 33 no longer limits the first support plate 32, allowing the first support plate 32 to tilt under gravity, releasing the firefighting medium 50.

In some embodiments, a material of the first support plate 32 may be metal.

In the technical solution of the embodiments of this application, since battery fires are often accompanied by high temperatures, the driving member 34 and the first locking member 33 are disposed to control the first support plate 32 to hold or release the firefighting medium 50, in place of manual release of the firefighting medium 50. This improves the convenience and safety of firefighting operations for the battery, and reduces the risk of losses caused by battery fires, thereby improving reliability of the battery transportation protection device 1 in transporting batteries.

Referring to FIG. 3 to FIG. 7, in some embodiments, the firefighting mechanism 30 further includes a second support plate 35, where the second support plate 35 is fixedly disposed relative to the case 10 and in a horizontal posture to hold the firefighting medium 50, and the first support plate 32 is rotatably connected to the second support plate 35. The detection component 20 is disposed on the second support plate 35.

In some embodiments, the firefighting mechanism 30 may include a second support plate 35, where the second support plate 35 may be fixedly disposed on the case 10. In the first state, both the first support plate 32 and the second support plate 35 may extend along the horizontal direction, and an upper surface of the first support plate 32 and an upper surface of the second support plate 35 may be on a same horizontal plane to jointly support the firefighting medium 50.

In some embodiments, a material of the second support plate 35 may be metal.

In some embodiments, the material of the second support plate 35 may be the same as the material of the first support plate 32.

In some embodiments, the second support plate 35 may be provided with a fixed shaft, and the first support plate 32 is rotatably connected to the fixed shaft, that is, the first support plate 32 is capable of rotating relative to the fixed shaft.

Since the first support plate 32 can rotate and is limited by the first locking member 33, and the firefighting medium 50 may be heavy, in some embodiments, the second support plate 35 and the first support plate 32 jointly hold the firefighting medium 50, so that in the first state, the first support plate 32 can better maintain the horizontal posture, reducing the load on the first locking member 33.

In some embodiments, the detection component 20 may be disposed on a lower surface of the second support plate 35, that is, the detection component 20 is located within the first accommodation cavity 11.

In some embodiments, the second support plate 35 is fixedly disposed on the case 10, allowing the second support plate 35 to effectively support the weight of the detection component 20.

In some embodiments, the second support plate 35 may be provided with a mounting hole, and the detection component 20 is connected to the mounting hole through a bolt.

In the technical solution of the embodiments of this application, the second support plate 35 is disposed to fix the first support plate 32, improving the convenience of disposing the first support plate 32. Additionally, the first support plate 32 and the second support plate 35 jointly hold the firefighting medium 50, improving the reliability of holding the firefighting medium 50. Additionally, the detection component 20 is disposed on the second support plate 35. Since the second support plate is fixedly disposed on the case 10, the detection component 20 is fixedly disposed, improving the installation reliability of the detection component 20.

Referring to FIG. 3 to FIG. 7, in some embodiments, the first support plate 32 and the second support plate 35 are both provided in plurality, and the first support plates 32 and the second support plates 35 are alternately arranged along a second direction Y, the extension direction of the first axis O, the second direction Y, and a direction of gravity Z being mutually perpendicular.

In some embodiments, the first support plates 32 may be provided in plurality, and the second support plates 35 may also be provided in plurality, and the first support plates 32 and the second support plates 35 may be alternately arranged along the second direction Y, that is, one second support plate 35 is disposed between two first support plates 32, and one first support plate 32 is disposed between two second support plates 35.

Since the first support plate 32 is a movable plate with limited load-bearing capacity, in some embodiments, the alternating arrangement of the first support plates 32 and the second support plates 35 can better support the firefighting medium 50. Additionally, during release of the firefighting medium 50, the first support plates 32 tilt, allowing the firefighting medium 50 to be released quickly from a lot of positions, better covering the fire-affected region of the battery.

In some embodiments, each second support plate 35 may be provided with a detection component 20, so that the plurality of detection components 20 can better detect the environmental parameter within the first accommodation cavity 11.

It should be noted that the driving member 34 may also be disposed on the second support plate 35. Due to the heavy weight of the driving member 34, to better support the driving member 34, two second support plates 35 may be directly connected to support the driving member 34, that is, no first support plate 32 is disposed between the two second support plates 35 supporting the driving member 34.

In the technical solution of the embodiments of this application, a plurality of first support plates 32 and a plurality of second support plates 35 are alternately arranged, so that the plurality of fixedly disposed second support plates 35 can effectively support the firefighting medium 50. Additionally, the plurality of first support plates 32 release the firefighting medium 50 at a fast speed, reducing the risk of losses caused by battery fires, thereby improving reliability of the battery transportation protection device 1 in transporting batteries.

Referring to FIG. 3 to FIG. 7, in some embodiments, a second opening 36 is formed between two adjacent second support plates 35, where in the first state, the first support plate 32 closes the second opening 36; and in the second state, the first support plate 32 opens the second opening 36.

In some embodiments, a second opening 36 may exist between two adjacent support plates, the second opening 36 being in communication with the first accommodation cavity 11. When the firefighting mechanism 30 is in the first state, the first support plate 32 is in a horizontal posture, and the first support plate 32 closes the second opening 36, isolating the firefighting medium 50 from the first accommodation cavity 11. When the firefighting mechanism 30 is in the second state, the first support plate 32 tilts, and the first support plate 32 opens the second opening 36, allowing the firefighting medium 50 to enter the first accommodation cavity 11 through the second opening 36.

In the technical solution of the embodiments of this application, the second opening 36 is closed through the first support plate 32 to support the firefighting medium 50; and the second opening 36 is opened through the first support plate 32 to release the firefighting medium 50, reducing the risk of losses caused by battery fires, thereby improving reliability of the battery transportation protection device 1 in transporting batteries.

Referring to FIG. 3 to FIG. 7, in some embodiments, the first locking member 33 is provided in plurality, the first support plates 32 and the first locking members 33 are in one-to-one correspondence, and the firefighting mechanism 30 further includes a linkage shaft 37, where the linkage shaft 37 connects the plurality of first locking members 33 to implement mutual linkage of the plurality of first locking members 33. The driving member 34 is connected to the linkage shaft 37.

In some embodiments, the first locking member 33 is provided in plurality, and the number of the first locking members 33 may be the same as the number of the first support plates 32, with one first support plate 32 corresponding to one first locking member 33.

In some embodiments, the driving member 34 may be a cylinder or a motor.

In some embodiments, the firefighting mechanism 30 may include a linkage shaft 37, where the linkage shaft 37 extends along the second direction Y, and the plurality of first locking members 33 are connected to the linkage shaft 37. One end of the linkage shaft 37 is connected to an output end of the driving member 34.

When the driving member 34 drives the linkage shaft 37 to move, the linkage shaft 37 drives the plurality of first locking members 33 to move, enabling the plurality of first support plates 32 to jointly release the firefighting medium 50.

In the technical solution of the embodiments of this application, the plurality of first locking members 33 are connected through the linkage shaft 37, so that the driving member 34 can drive, through the linkage shaft 37, the plurality of first locking members 33 to move. This improves consistency in releasing the firefighting medium 50 by a plurality of first support plates 32 and reduces the number of driving members 34, thereby saving costs.

Referring to FIG. 3 to FIG. 7, in some embodiments, the plurality of first locking members 33 are respectively disposed on the plurality of second support plates 35.

In some embodiments, each first locking member 33 corresponds to one first support plate 32, and each first locking member 33 may be disposed on the second support plate adjacent to the first support plate 32.

In the technical solution of the embodiments of this application, a plurality of first locking members 33 are disposed on the second support plates 35. Since the second support plates are fixedly disposed on the case 10, the first locking members 33 are fixedly disposed, improving the installation reliability of the first locking members 33.

Referring to FIG. 3 to FIG. 7, in some embodiments, the firefighting mechanism 30 further includes a mounting seat 38 and a second locking member 39, where the mounting seat 38 is fixed to the second support plate 35, the first locking member 33 is movably disposed on the mounting seat 38, the second locking member 39 is fixed to the first support plate 32, and the second locking member 39 has a locking hole 391 for insertion of the first locking member 33.

In some embodiments, the firefighting mechanism 30 may include a mounting seat 38, where the first locking member 33 is movably connected to the mounting seat 38, allowing the first locking member 33 to move along the second direction Y relative to the mounting seat 38.

In some embodiments, when the firefighting mechanism 30 is in the first state, the first locking member 33 extends into the locking hole 391 of the second locking member 39, so that the first locking member 33 fixes the second locking member 39 in the direction of gravity. Since the second locking member 39 is fixed to the first support plate 32, the first locking member 33 can limit the first support plate 32.

When the firefighting mechanism 30 switches from the first state to the second state, the driving member 34 drives the first locking member 33 to move away from the second locking member 39 along the second direction Y, causing the first locking member 33 to retract from the locking hole 391. In this case, the second locking member 39 loses its limitation, and the first support plate 32 tilts under gravity.

In some embodiments, the number of the second locking members 39 may be the same as the number of the first locking members 33, with one first locking member 33 corresponding to one second locking member 39.

In some embodiments, both the first locking member 33 and the second locking member 39 may be made of metal.

In some embodiments, the mounting seat 38 and the second support plate 35 may be connected by bolting or welding.

In some embodiments, the second locking member 39 and the first support plate 32 may be connected by bolting or welding.

In the technical solution of the embodiments of this application, the first locking member 33 and the second locking member 39 cooperate to enable the first support plate 32 to hold or release the firefighting medium 50, reducing the risk of losses caused by battery fires, thereby improving reliability of the battery transportation protection device 1 in transporting batteries.

Referring to FIG. 3, FIG. 4, FIG. 8, and FIG. 9, in some embodiments, the plurality of pressure relief modules 40 are located above the firefighting mechanism 30, the firefighting mechanism 30 is provided with a communication hole 31, and the communication hole 31 connects the pressure relief channel 121 and the first accommodation cavity 11.

In some embodiments, an opening in communication with the first accommodation cavity 11 may be provided in the lower part of the second accommodation cavity 122, the pressure relief modules 40 are disposed in the second accommodation cavity 122, and the first support plate 32 and the second support plate 35 of the firefighting mechanism 30 may close the opening, so that a pressure relief module is located above the firefighting mechanism 30 and the pressure relief module is also located above the firefighting medium 50.

To facilitate the entry of gas from the first accommodation cavity 11 into the second accommodation cavity 122, the first support plate 32 and the second support plate 35 may be provided with communication holes 31, and the communication holes 31 connect the first accommodation cavity 11 and the second accommodation cavity 122.

The first support plate 32 and the second support plate 35 may both be provided in plurality, and the first support plates 32 and the second support plates 35 may each be provided with a communication hole 31, that is, there may be a plurality of communication holes 31, where the plurality of communication holes 31 are spaced apart.

In some embodiments, one communication hole 31 may be provided. The first support plate 32 and the second support plate 35 may each be provided with a plurality of through-holes, where the plurality of through-holes are interconnected and arranged along the second direction Y, and the plurality of through-holes form communication hole 31 extending along the second direction Y To reduce the risk of the firefighting medium 50 falling into the first accommodation cavity 11 through the communication hole 31, a baffle protruding from the upper surface of the first support plate 32 and the upper surface of the second support plate 35 may be disposed around the communication hole 31 to limit the firefighting medium 50.

The firefighting medium 50 may be divided into two parts, and the two parts of the firefighting medium 50 are respectively located on two sides of the communication hole 31 in the second direction Y.

In some embodiments, in the direction of gravity Z, the communication hole 31 may correspond to a gap between the two rows of pressure relief modules 40, so that when the battery catches fire, gas from the first accommodation cavity 11 enters the gap between the two rows of pressure relief modules 40 through the communication hole 31 and is discharged from the two rows of pressure relief modules 40.

In the technical solution of the embodiments of this application, the communication hole 31 is disposed in the firefighting mechanism 30 to connect the pressure relief channel 121 and the first accommodation cavity 11, facilitating the discharge of gas from the first accommodation cavity 11 through the pressure relief channel 121. This reduces the risk of excessive air pressure in the first accommodation cavity 11, thereby improving reliability of the battery transportation protection device 1 in transporting batteries.

Referring to FIG. 1 to FIG. 3, in some embodiments, the environmental parameter includes at least one of temperature, combustible gas concentration, or air pressure.

In some embodiments, the environmental parameter may include one of temperature, combustible gas concentration, and air pressure, that is, the detection component 20 may be at least one of a temperature sensor, a combustible gas concentration sensor, or an air pressure sensor.

In some embodiments, a plurality of detection component 20 may be provided, and the plurality of detection components 20 may be a temperature sensor, a combustible gas concentration sensor, and an air pressure sensor, respectively, or the detection component 20 may be integrated with sensors for detecting temperature, detecting combustible gas concentration detection, and detecting air pressure.

In some embodiments, the detection component 20 may also be connected to an external monitoring system via a signal connection, where the signal connection may be a circuit connection, a Wi-Fi connection, a Bluetooth connection, or the like. A plurality of detection component 20 may also be provided, and the plurality of detection components 20 may be a temperature sensor, a combustible gas concentration sensor, and an air pressure sensor, respectively. The detection process may be as follows: First, the temperature sensor detects the temperature in the first accommodation cavity 11. When data detected by the temperature sensor exceeds a threshold, the temperature sensor transmits the detected data to a monitoring system, and the combustible gas concentration sensor and the air pressure sensor begin operation. When either the combustible gas concentration sensor or the air pressure sensor detects data exceeding the threshold, both send an alarm signal to the monitoring system, causing the firefighting mechanism 30 to switch from the first state to the second state to release the firefighting medium 50 to the battery.

It should be noted that the alarm signal received by the monitoring system may be a buzzer, a flashing red light on a display screen, or the like.

In some embodiments, the firefighting mechanism 30 may further include a display, where the display is disposed outside the case 10, and the display is in signal connection with the detection component 20. After the battery is placed into the case 10, the detection component 20 detects the environmental parameter of the first accommodation cavity 11 and displays it on the display to ensure that the battery is in a normal state when the battery is packed.

Battery thermal runaway is accompanied by temperature increase, release of combustible gases (such as H2 and CO), and the like, and the released gases also change the air pressure within the first accommodation cavity 11. In the technical solution of the embodiments of this application, the detection component 20 monitors at least one of temperature, combustible gas concentration, and air pressure, making it possible to quickly identify whether the transported battery undergoes thermal runaway. This reduces the risk of losses caused by battery fires, thereby improving reliability of the battery transportation protection device 1 in transporting batteries.

Referring to FIG. 1 to FIG. 3, in some embodiments, the firefighting medium 50 includes flame-retardant microbeads.

In some embodiments, the flame-retardant microbeads are functional particles with a diameter in the micrometer or millimeter range, capable of flame retardation through physical or chemical actions.

The flame-retardant microbeads can achieve flame retardation through physical actions, similar to the principle of extinguishing fires with sand. When in contact with the ignition site, the flame-retardant microbeads reduce the oxygen content available to the flame, or the flame-retardant microbeads expand when heated to form a thermal insulation layer.

The flame-retardant microbeads can also achieve flame retardation through chemical actions. The flame-retardant microbeads decompose when heated, absorbing heat and releasing water vapor, such as aluminum hydroxide or magnesium hydroxide, or the flame-retardant microbeads release inert gases, such as melamine.

In some embodiments, the flame-retardant microbeads may adopt a hollow structure to reduce the weight of the flame-retardant microbeads, thereby reducing the weight of the battery transportation protection device 1.

In the technical solution of the embodiments of this application, flame-retardant microbeads have good heat absorption properties and can expand in high-temperature environments to form a physical flame-retardant layer, and flame-retardant microbeads are also highly lightweight. Using flame-retardant microbeads as the firefighting medium 50 can reduce the risk of losses caused by battery fires, thereby improving reliability of the battery transportation protection device 1 in transporting batteries and reducing the weight of the battery transportation protection device 1.

Referring to FIG. 3, in some embodiments, the flame-retardant microbead includes at least one of glass microbead, ceramic microbead, or mineral microbead.

In some embodiments, the flame-retardant microbeads may be glass microbeads.

In the technical solution of the embodiments of this application, using at least one of glass microbead, ceramic microbead, or mineral microbead as the firefighting medium 50 can reduce the risk of losses caused by battery fires, thereby improving reliability of the battery transportation protection device 1 in transporting batteries and reducing the weight of the battery transportation protection device 1.

Referring to FIG. 1 and FIG. 3, in some embodiments, the case cover 12 includes a case cover frame 123, a first thermal insulation lining 124, and a second thermal insulation lining 125, where the case cover frame 123 supports the pressure relief modules 40, the first thermal insulation lining 124 and the second thermal insulation lining 125 are both connected to the case cover frame 123, the first thermal insulation lining 124 is disposed around the pressure relief modules 40, the second thermal insulation lining 125 is disposed above the pressure relief modules 40, and the first thermal insulation lining 124 and the second thermal insulation lining 125 together enclose the second accommodation cavity 122.

In some embodiments, the case cover frame 123 may be a frame formed by welding metal tubes.

In some embodiments, the pressure relief modules 40 may be disposed in the case cover frame 123 to enhance the strength of the case cover 12, thereby improving the reliability of disposing the pressure relief modules 40.

When the battery catches fire, the gas discharged through the pressure relief channel 121 of the pressure relief modules 40 increases the surface temperature of the pressure relief modules 40, which, due to heat transfer, may increase the temperature of the outer surface of the case cover 12. In some embodiments, the first thermal insulation lining 124 and the second thermal insulation lining 125 are respectively disposed around and above the pressure relief modules 40, reducing the risk of the temperature of the pressure relief modules 40 transferring to the outer surface of the case cover 12 and causing a high temperature on the outer surface of the case cover 12.

In some embodiments, the first thermal insulation lining 124 may be disposed around an outer periphery of the second thermal insulation lining 125, an upper end of the first thermal insulation lining 124 is connected to the second thermal insulation lining 125, forming a second accommodation cavity 122 with an opening below. Gas from the first accommodation cavity 11 enters the second accommodation cavity 122 through the opening of the second accommodation cavity 122.

In some embodiments, the first thermal insulation lining 124 may be connected to an inner periphery of the case cover frame 123, the second thermal insulation lining 125 may be connected to the top of the case cover frame 123, and the first thermal insulation lining 124 and the second thermal insulation lining 125 are not directly connected.

In the technical solution of the embodiments of this application, the case cover frame 123 is disposed to support the pressure relief modules 40, improving the reliability of disposing the pressure relief modules 40. The first thermal insulation lining 124 and the second thermal insulation lining 125 are disposed around and above the pressure relief modules 40, so that the case cover 12 has good thermal insulation properties, reducing the impact of temperature on the outer surface of the case cover 12 when high-temperature gas is discharged.

Referring to FIG. 1 and FIG. 3, in some embodiments, a material of the first thermal insulation lining 124 includes aerogel; and a material of the second thermal insulation lining 125 includes aerogel.

In some embodiments, the material of the first thermal insulation lining 124 and the material of the second thermal insulation lining 125 may be the same or different.

In some embodiments, the material of the first thermal insulation lining 124 may be silicate aerogel, alumina aerogel, titanium oxide aerogel, or the like.

In some embodiments, the material of the second thermal insulation lining 125 may be silicate aerogel, alumina aerogel, titanium oxide aerogel, or the like.

In some embodiments, both the first thermal insulation lining 124 and the second thermal insulation lining 125 may be silicate-based aerogel plates.

In the technical solution of the embodiments of this application, aerogel has good thermal insulation performance and low density. Using aerogel as the material for the first thermal insulation lining 124 and the second thermal insulation lining 125 allows the case cover 12 to have good thermal insulation properties, and reduces the weight of the battery transportation protection device 1.

Referring to FIG. 1 and FIG. 3, in some embodiments, the case cover 12 further includes a case cover outer plate 126, where the case cover outer plate 126 is connected to the case cover frame 123, the case cover outer plate 126 is disposed around the pressure relief modules 40, and the case cover outer plate 126 is located on an outer side of the first thermal insulation lining 124.

In some embodiments, a material of the case cover outer plate 126 may be metal.

In some embodiments, the case cover outer plate 126 may be connected to an outer periphery of the case cover frame 123 and located on the outer side of the first thermal insulation lining 124.

In the technical solution of the embodiments of this application, the case cover outer plate 126 is disposed on the outer side of the first thermal insulation lining 124, reducing the risk of damaging the first thermal insulation lining 124 and affecting the thermal insulation performance of the case cover 12, thereby improving the reliability of the case cover 12.

Referring to FIG. 1 and FIG. 3, in some embodiments, the first thermal insulation lining 124 is provided with a first pressure relief port 1241, the case cover outer plate 126 is provided with a second pressure relief port 1261 corresponding to the first pressure relief port 1241, and the first pressure relief port 1241 connects the second pressure relief port 1261 and the pressure relief channel 121.

In some embodiments, the first thermal insulation lining 124 may be provided with a first pressure relief port 1241, and the case cover outer plate 126 may be provided with a second pressure relief port 1261, where the first pressure relief port 1241 and the second pressure relief port 1261 are in communication, and the first pressure relief port 1241 may be in communication with the smoke outlet 42 of the pressure relief channel 121.

In some embodiments, when the battery catches fire, gas from the first accommodation cavity 11 enters the pressure relief channel 121 through the communication hole 31 and the smoke inlet 41, and after the gas is filtered by the filter 44, the gas is discharged from the smoke outlet 42 through the first pressure relief port 1241 and the second pressure relief port 1261.

In some embodiments, a plurality of pressure relief modules 40 may be provided, that is, a plurality of smoke outlets 42 may be provided, and the number of first pressure relief ports 1241 and the number of the second pressure relief ports 1261 may be the same as the number of smoke outlets 42, with one first pressure relief port 1241 corresponding to one second pressure relief port 1261 and one smoke outlet 42.

In the technical solution of the embodiments of this application, the first pressure relief port 1241 and the second pressure relief port 1261 are disposed to connect the pressure relief channel 121, improving the convenience of discharging gas from the first accommodation cavity 11.

Referring to FIG. 1 and FIG. 3, in some embodiments, the case cover 12 further includes a case cover top plate 127, where the case cover top plate 127 is connected to the case cover frame 123, and the case cover top plate 127 is located on a side of the second thermal insulation lining 125 facing away from the pressure relief modules 40.

In some embodiments, a material of the case cover top plate 127 may be metal.

In some embodiments, the case cover outer plate 126 may be disposed around an outer periphery of the case cover top plate 127, and an upper end of the case cover outer plate 126 is connected to the case cover top plate 127.

In some embodiments, the case cover outer plate 126 may be connected to an outer periphery of the case cover frame 123, the case cover top plate 127 may be connected to the top of the case cover frame 123, and the case cover outer plate 126 and the case cover top plate 127 are not directly connected.

In some embodiments, the material of the case cover outer plate 126 may be the same as the material of the case cover top plate 127.

In some embodiments, the material of the case cover outer plate 126 may be different from the material of the case cover top plate 127.

In the technical solution of the embodiments of this application, the case cover top plate 127 is disposed on the outer side of the second thermal insulation lining 125, reducing the risk of damaging the second thermal insulation lining 125 and affecting the thermal insulation performance of the case cover 12, thereby improving the reliability of the case cover 12.

Figure 11:
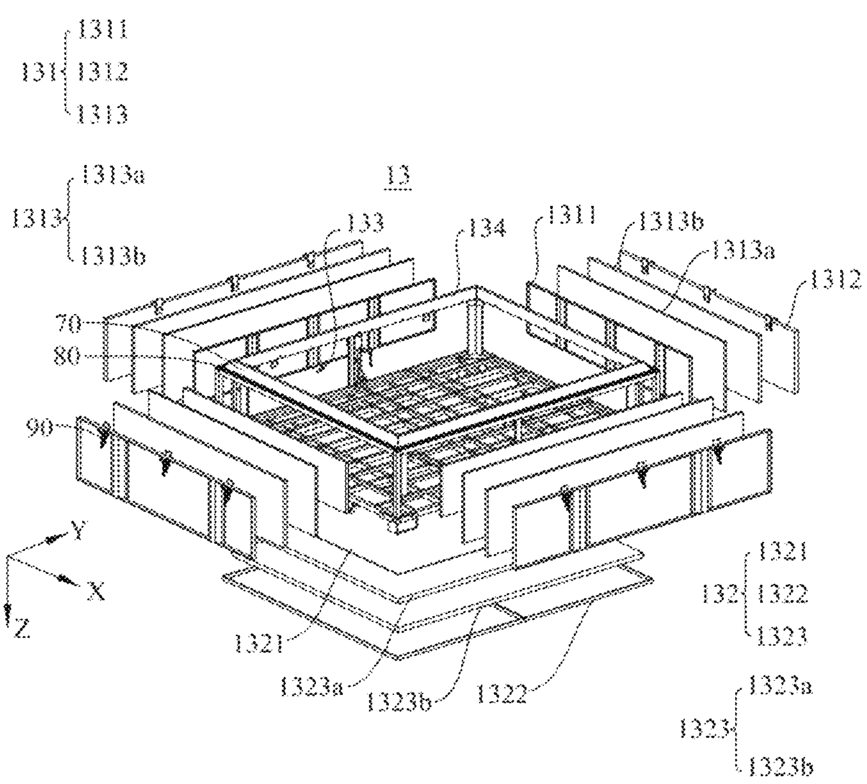
FIG. 11 is a structural exploded view of a case body according to some embodiments of this application.

Referring to FIG. 1 and FIG. 11, FIG. 11 is a structural exploded view of a case body according to some embodiments of this application. In some embodiments, the case body 13 includes a side wall 131 and a bottom wall 132, where the bottom wall 132 is disposed opposite the case cover 12, the side wall 131 is disposed around the bottom wall 132, a lower end of the side wall 131 is connected to the bottom wall 132, and an upper end of the side wall 131 is connected to the case cover 12. The side wall 131 includes a side wall lining 1311, a side wall shell 1312, and a first flame-retardant insulation layer 1313, where the first flame-retardant insulation layer 1313 is located between the side wall lining 1311 and the side wall shell 1312.

In some embodiments, in the direction of gravity Z, the bottom wall 132 may be disposed opposite the case cover 12, and a thickness direction of the bottom wall 132 may be parallel to a thickness direction of the case cover 12.

In some embodiments, the side wall 131 may include a side wall lining 1311, where the side wall lining 1311 is configured to form the first accommodation cavity 11. When the battery is located in the first accommodation cavity 11, the side wall lining 1311 is a part of the side wall 131 facing the battery, and the side wall shell 1312 is a part of the side wall 131 facing away from the battery.

In some embodiments, a material of the side wall shell 1312 and a material of the side wall lining 1311 may both be metal.

In some embodiments, the material of the side wall shell 1312 and the material of the side wall lining 1311 may be the same or different.

When the battery catches fire, the temperature in the first accommodation cavity 11 rises. To reduce the risk of heat from the first accommodation cavity 11 transferring to the outer surface of the case body 13 and causing an excessively high temperature on the outer surface of the case body 13, in some embodiments, a first flame-retardant insulation layer 1313 is disposed between the side wall lining 1311 and the side wall shell 1312.

In some embodiments, a material of the first flame-retardant insulation layer 1313 may be aerogel, a fiber refractory material, glass wool, or the like.

In the technical solution of the embodiments of this application, the first flame-retardant insulation layer 1313 is disposed between the side wall lining 1311 and the side wall shell 1312, so that the case body 13 has good thermal insulation properties, reducing the impact of temperature on the outer surface of the case body 13 during battery thermal runaway.

Referring to FIG. 1 and FIG. 11, in some embodiments, the first flame-retardant insulation layer 1313 includes a first flame-retardant insulation sublayer **1313*a* and a second flame-retardant insulation sublayer 1313*b*, where the second flame-retardant insulation sublayer 1313*b* is located between the side wall lining 1311 and the first flame-retardant insulation sublayer 1313*a*. A thermal conductivity of the second flame-retardant insulation sublayer 1313*b* is less than a thermal conductivity of the first flame-retardant insulation sublayer 1313*a***.

When the battery catches fire, heat transfers outward from the first accommodation cavity 11, causing the temperature of the case body 13 to gradually increase from the outside to the inside. In some embodiments, the first flame-retardant insulation layer 1313 is divided into two layers, that is, the first flame-retardant insulation layer 1313 includes a first flame-retardant insulation sublayer **1313*a* and a second flame-retardant insulation sublayer 1313*b*, where a thermal conductivity of the second flame-retardant insulation sublayer 1313*b* is less than a thermal conductivity of the first flame-retardant insulation sublayer 1313*a*, meaning that the second flame-retardant insulation sublayer 1313*b* has better thermal insulation performance. Additionally, the second flame-retardant insulation sublayer 1313*b* is located between the side wall lining 1311 and the first flame-retardant insulation sublayer 1313*a*, that is, the second flame-retardant insulation sublayer 1313*b* is located on an inner side of the first flame-retardant insulation sublayer 1313*a*, serving as the first layer of insulation to isolate most of the heat in the first accommodation cavity 11, and then the first flame-retardant insulation sublayer 1313*a*** isolates the remaining small amount of heat.

In the technical solution of the embodiments of this application, the second flame-retardant insulation sublayer **1313*b* is disposed on the inner side of the first flame-retardant insulation sublayer 1313*a*, with the thermal conductivity of the second flame-retardant insulation sublayer 1313*b* being less than the thermal conductivity of the first flame-retardant insulation sublayer 1313*a*. This implements a gradient insulation where the thermal insulation performance of the case body 13 increases from the outside to the inside, making the arrangement of the first flame-retardant insulation layer 1313** more reasonable.

Referring to FIG. 1 and FIG. 11, in some embodiments, the first flame-retardant insulation sublayer **1313*a* includes aerogel, and the second flame-retardant insulation sublayer 1313*b*** includes a fiber refractory material.

In some embodiments, a material of the first flame-retardant insulation sublayer **1313*a*** may be aerogel, such as silicate aerogel, alumina aerogel, or titanium oxide aerogel.

In some embodiments, the first flame-retardant insulation sublayer **1313*a*** may be a silicate-based aerogel plate.

In some embodiments, a material of the second flame-retardant insulation sublayer **1313*b*** may be aluminum silicate refractory fiber, chromium-containing aluminum silicate refractory fiber, zirconia refractory fiber, or the like.

In some embodiments, the second flame-retardant insulation sublayer **1313*b*** may be a ceramic fiber plate.

In the technical solution of the embodiments of this application, aerogel has low density, and fiber refractory material has low thermal conductivity. Aerogel is disposed as the first flame-retardant insulation sublayer **1313*a* and a fiber refractory material is disposed as the second flame-retardant insulation sublayer 1313*b*, implementing a gradient insulation where the thermal insulation performance of the case body 13 increases from the outside to the inside. This makes the arrangement of the first flame-retardant insulation layer 1313 more reasonable, and reduces the weight of the battery transportation protection device 1**.

Referring to FIG. 1 and FIG. 11, in some embodiments, the bottom wall 132 includes a bottom wall lining 1321, a bottom wall shell 1322, and a second flame-retardant insulation layer 1323, where the second flame-retardant insulation layer 1323 is located between the bottom wall lining 1321 and the bottom wall shell 1322.

In some embodiments, in the direction of gravity Z, the bottom wall lining 1321, the second flame-retardant insulation layer 1323, and the bottom wall shell 1322 are arranged in sequence.

In some embodiments, the bottom wall 132 may include a bottom wall lining 1321, where the bottom wall lining 1321 is configured to form the first accommodation cavity 11. When the battery is located in the first accommodation cavity 11, the bottom wall lining 1321 is a part of the bottom wall 132 facing the battery, and the bottom wall shell 1322 is a part of the bottom wall 132 facing away from the battery.

In some embodiments, a material of the bottom wall shell 1322 and a material of the bottom wall lining 1321 may both be metal.

In some embodiments, the material of the bottom wall shell 1322 and the material of the bottom wall lining 1321 may be the same or different.

When the battery catches fire, the temperature in the first accommodation cavity 11 rises. To reduce the risk of heat from the first accommodation cavity 11 transferring to the outer surface of the case body 13 and causing an excessively high temperature on the outer surface of the case body 13, in some embodiments, a second flame-retardant insulation layer 1323 is disposed between the bottom wall lining 1321 and the bottom wall shell 1322.

In some embodiments, a material of the second flame-retardant insulation layer 1323 may be aerogel, a fiber refractory material, glass wool, or the like.

In the technical solution of the embodiments of this application, the second flame-retardant insulation layer 1323 is disposed between the bottom wall lining 1321 and the bottom wall shell 1322, so that the case body 13 has good thermal insulation properties, reducing the impact of temperature on the outer surface of the case body 13 during battery thermal runaway.

Referring to FIG. 1 and FIG. 11, in some embodiments, the second flame-retardant insulation layer 1323 includes a third flame-retardant insulation sublayer 1323*a* and a fourth flame-retardant insulation sublayer 1323*b*, where the third flame-retardant insulation sublayer 1323*a* is located between the bottom wall lining 1321 and the fourth flame-retardant insulation sublayer 1323*b*. A thermal conductivity of the third flame-retardant insulation sublayer 1323*a* is less than a thermal conductivity of the fourth flame-retardant insulation sublayer 1323*b*.

When the battery catches fire, heat transfers outward from the first accommodation cavity 11, causing the temperature of the case body 13 to gradually increase from the outside to the inside. In some embodiments, the second flame-retardant insulation layer 1323 is divided into two layers, that is, the second flame-retardant insulation layer 1323 includes a third flame-retardant insulation sublayer 1323*a* and a fourth flame-retardant insulation sublayer 1323*b*, where a thermal conductivity of the third flame-retardant insulation sublayer 1323*a* is less than a thermal conductivity of the fourth flame-retardant insulation sublayer 1323*b*, meaning that the third flame-retardant insulation sublayer 1323*a* has better thermal insulation performance. Additionally, the third flame-retardant insulation sublayer 1323*a* is located between the bottom wall lining 1321 and the fourth flame-retardant insulation sublayer 1323*b*, that is, the third flame-retardant insulation sublayer 1323*a* is located on an inner side of the fourth flame-retardant insulation sublayer 1323*b*, serving as the first layer of insulation to isolate most of the heat in the first accommodation cavity 11, and then the fourth flame-retardant insulation sublayer 1323*b* isolates the remaining small amount of heat.

In the technical solution of the embodiments of this application, the third flame-retardant insulation sublayer 1323*a* is disposed on the inner side of the fourth flame-retardant insulation sublayer 1323*b*, with the thermal conductivity of the third flame-retardant insulation sublayer 1323*a* being less than the thermal conductivity of the fourth flame-retardant insulation sublayer 1323*b*. This implements a gradient insulation where the thermal insulation performance of the case body 13 increases from the outside to the inside, making the arrangement of the second flame-retardant insulation layer 1323 more reasonable.

Referring to FIG. 1 and FIG. 11, in some embodiments, the third flame-retardant insulation sublayer 1323*a* includes a fiber refractory material, and the fourth flame-retardant insulation sublayer 1323*b* includes aerogel.

In some embodiments, a material of the fourth flame-retardant insulation sublayer 1323*b* may be aerogel, such as silicate aerogel, alumina aerogel, or titanium oxide aerogel.

In some embodiments, the fourth flame-retardant insulation sublayer 1323*b* may be a silicate-based aerogel plate.

In some embodiments, a material of the third flame-retardant insulation sublayer 1323*a* may be aluminum silicate refractory fiber, chromium-containing aluminum silicate refractory fiber, zirconia refractory fiber, or the like.

In some embodiments, the third flame-retardant insulation sublayer 1323*a* may be a ceramic fiber plate.

In the technical solution of the embodiments of this application, aerogel is disposed as the fourth flame-retardant insulation sublayer 1323*b* and a fiber refractory material is disposed as the third flame-retardant insulation sublayer 1323*a*, implementing a gradient insulation where the thermal insulation performance of the case body 13 increases from the outside to the inside. This makes the arrangement of the second flame-retardant insulation layer 1323 more reasonable, and reduces the weight of the battery transportation protection device 1.

Referring to FIG. 1 and FIG. 11, in some embodiments, the first flame-retardant insulation layer 1313 includes a first flame-retardant insulation sublayer 1313*a* and a second flame-retardant insulation sublayer 1313*b*, where the second flame-retardant insulation sublayer 1313*b* is located between the side wall lining 1311 and the first flame-retardant insulation sublayer 1313*a*. A material of the first flame-retardant insulation sublayer 1313*a* is the same as a material of the fourth flame-retardant insulation sublayer 1323*b*, and a thickness of the fourth flame-retardant insulation sublayer 1323*b* is greater than a thickness of the first flame-retardant insulation sublayer 1313*a*; and a material of the second flame-retardant insulation sublayer 1313*b* is the same as a material of the third flame-retardant insulation sublayer 1323*a*, and a thickness of the third flame-retardant insulation sublayer 1323*a* is greater than a thickness of the second flame-retardant insulation sublayer 1313*b*.

In some embodiments, the material of the first flame-retardant insulation sublayer 1313*a* is the same as the material of the fourth flame-retardant insulation sublayer 1323*b*, and the thickness of the fourth flame-retardant insulation sublayer 1323*b* is greater than the thickness of the first flame-retardant insulation sublayer 1313*a*, making the thermal insulation effect of the fourth flame-retardant insulation sublayer 1323*b* better than the thermal insulation effect of the first flame-retardant insulation sublayer 1313*a*.

The material of the second flame-retardant insulation sublayer 1313*b* is the same as the material of the third flame-retardant insulation sublayer 1323*a*, and the thickness of the third flame-retardant insulation sublayer 1323*a* is greater than the thickness of the second flame-retardant insulation sublayer 1313*b*, making the thermal insulation effect of the third flame-retardant insulation sublayer 1323*a* better than the thermal insulation effect of the second flame-retardant insulation sublayer 1313*b*.

In other words, the thermal insulation effect of the second flame-retardant insulation layer 1323 located below is better than the thermal insulation effect of the surrounding first flame-retardant insulation layer 1313. When the battery catches fire, the generated high-temperature substances (such as liquids or fluids from battery melting) gather at the bottom wall 132 under gravity, requiring higher flame-retardant and thermal insulation performance for the bottom wall 132. Therefore, the thermal insulation effect of the second flame-retardant insulation layer 1323 located below is set to be better than the thermal insulation effect of the surrounding first flame-retardant insulation layer 1313.

When a battery undergoes thermal runaway, the high-temperature substances generated gather at the bottom of the case body 13 under the action of gravity. In the technical solution of the embodiments of this application, the material of the first flame-retardant insulation sublayer 1313*a* is set to be the same as the material of the fourth flame-retardant insulation sublayer 1323*b*, the material of the second flame-retardant insulation sublayer 1313*b* is set to be the same as the material of the third flame-retardant insulation sublayer 1323*a*, the thickness of the fourth flame-retardant insulation sublayer 1323*b* is set to be greater than the thickness of the first flame-retardant insulation sublayer 1313*a*, and the thickness of the third flame-retardant insulation sublayer 1323*a* is set to be greater than the thickness of the second flame-retardant insulation sublayer 1313*b*, making the thermal conductivity of the bottom wall 132 lower than the thermal conductivity of the side wall 131. This allows the bottom wall 132 to have good thermal insulation properties, reducing the impact of temperature on the outer surface of the bottom wall 132 during battery thermal runaway.

Figure 12:
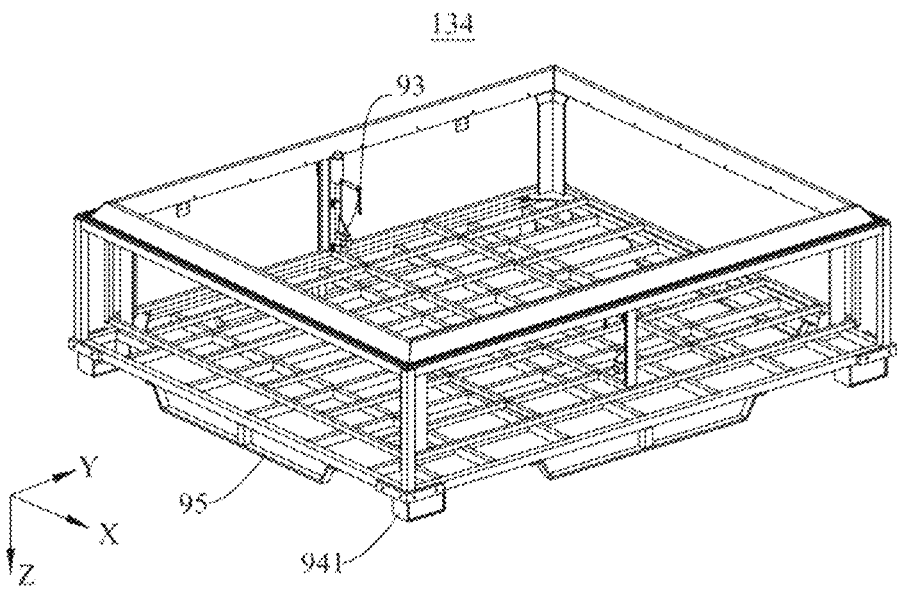
FIG. 12 is a schematic diagram of a case body frame according to some embodiments of this application.

Referring to FIG. 1, FIG. 11, and FIG. 12, FIG. 12 is a schematic diagram of a case body frame according to some embodiments of this application. In some embodiments, the case body 13 further includes a case body frame 134, where the side wall 131 and the bottom wall 132 are both connected to the case body frame 134.

In some embodiments, the case body frame 134 may be a frame formed by welding metal tubes.

In some embodiments, the pressure relief modules 40 may be disposed in the case body frame 134 to enhance the strength of the case 10, thereby improving the reliability of disposing the battery.

In some embodiments, the case body frame 134 may be divided into two layers of frames, where the bottom wall lining 1321 and the side wall lining 1311 may be disposed on the inner-layer frame, the bottom wall shell 1322 and the side wall shell 1312 may be disposed on the outer-layer frame, and the first flame-retardant insulation layer 1313 and the second flame-retardant insulation layer 1323 are disposed in a space between the two layers of frames.

In some embodiments, the bottom wall lining 1321, the bottom wall shell 1322, the side wall lining 1311, and the side wall shell 1312 may be plates, and the plates may be bent to form reinforcing ribs to enhance the structural strength of the plates.

In some embodiments, the plates may be bent to form an included angle, and the bent plates may wrap around support beams around the case body frame 134 to enhance the support strength of the case body frame 134.

In the technical solution of the embodiments of this application, the case body frame 134 is disposed to connect the side wall 131 and the bottom wall 132, improving the reliability of disposing the pressure relief modules 40.

Referring to FIG. 1, FIG. 11, and FIG. 12, in some embodiments, the case cover 12 includes a case cover frame 123, and the battery transportation protection device 1 includes a first connection frame 70 and a second connection frame 71, where the first connection frame 70 is connected to the case body frame 134, the first connection frame 70 encloses the first opening 133, and the second connection frame 71 is connected to the case cover frame 123. An outer peripheral surface of one of the first connection frame 70 and the second connection frame 71 is a slanted surface, and an inner peripheral surface of the other is a slanted surface, the outer peripheral surface and the inner peripheral surface being cooperatively connected.

In some embodiments, the outer peripheral surface of the first connection frame 70 may be a slanted surface, and the inner peripheral surface of the second connection frame 71 may be a slanted surface, the outer peripheral surface and the inner peripheral surface being cooperatively connected.

In some embodiments, the outer peripheral surface of the second connection frame 71 may be a slanted surface, and the inner peripheral surface of the first connection frame 70 may be a slanted surface, the outer peripheral surface and the inner peripheral surface being cooperatively connected.

In some embodiments, the first connection frame 70 may be connected to the top of the case body frame 134 and enclose the first opening 133. The second connection frame 71 may be connected to the bottom of the case cover frame 123 and is disposed at a position corresponding to that of the first connection frame 70.

The outer peripheral surface of the first connection frame 70 may be a slanted surface, and along the direction of gravity Z, the outer peripheral surface of the first connection frame 70 may be a slanted surface inclined in a direction back away from the centerline of the case 10. The inner peripheral surface of the second connection frame 71 may be a slanted surface, and along the direction of gravity Z, the inner peripheral surface of the second connection frame 71 may be a slanted surface inclined in a direction back away from the centerline of the case 10.

In the technical solution of the embodiments of this application, the slanted surface of the first connection frame 70 and the slanted surface of the second connection frame 71 cooperate to connect the case cover 12 and the case body 13, limiting positions of the case cover 12 and the case body 13 in the horizontal direction, thereby improving reliability of the connection between the case cover 12 and the case body 13. Additionally, the cooperation of the two slanted surfaces facilitates positioning and installation during the connection of the case cover 12 and the case body 13.

Referring to FIG. 1, FIG. 11, and FIG. 12, in some embodiments, the battery transportation protection device 1 further includes a sealing member 80, where the sealing member 80 is configured to seal a gap between the first connection frame 70 and the second connection frame 71.

When the battery catches fire, there may be a risk of the generated gas escaping from the first accommodation cavity 11. In some embodiments, a sealing member 80 may be disposed to seal a gap between the first connection frame 70 and the second connection frame 71.

Since the generated gas has relatively high temperature, a material of the sealing member 80 may be a material with good high-temperature resistance.

In some embodiments, a material of the sealing member 80 may be ethylene propylene diene monomer rubber.

In the technical solution of the embodiments of this application, a sealing member 80 is disposed in the gap between the first connection frame 70 and the second connection frame 71, reducing the risk of external impurities entering the first accommodation cavity 11 and damaging the battery. Additionally, during battery thermal runaway, the sealing member 80 can reduce the risk of high-temperature substances leaking from the gap between the first connection frame 70 and the second connection frame 71, thereby reducing the risk of losses.

Referring to FIG. 1, FIG. 3, and FIG. 11, in some embodiments, one of the case body 13 and the case cover 12 is provided with a latch 90, and the other is provided with a bracket 91, where the latch 90 is connected to the bracket 91 to lock the case cover 12 to the case body 13.

In some embodiments, the case cover 12 may be provided with the latch 90, and the case body 13 may be provided with the bracket 91. When the case cover 12 is connected to the case body 13, the latch 90 and the bracket 91 cooperate to limit the case cover 12 and the case body 13 in the direction of gravity Z. When the battery needs to be removed, the latch 90 is separated from the bracket 91, thereby separating the case cover 12 from the case body 13.

In some embodiments, the case body 13 may be provided with the latch 90, and the case cover 12 may be provided with the bracket 91. When the case cover 12 is connected to the case body 13, the bracket 91 may be provided with a lock hole, and the latch 90 and the lock hole cooperate to limit the case cover 12 and the case body 13 in the direction of gravity Z. When the battery needs to be removed, the latch 90 is separated from the bracket 91, thereby separating the case cover 12 from the case body 13.

In some embodiments, the latch 90 and the bracket 91 may both be provided in plurality, and the number of latches 90 is the same as the number of brackets 91, the latches 90 and the brackets 91 being in one-to-one correspondence. The plurality of latches 90 and the plurality of brackets 91 may be evenly distributed around the case 10.

In the technical solution of the embodiments of this application, the case cover 12 and the case body 13 are connected through the latch 90 and the bracket 91, facilitating the connection and separation of the case cover 12 and the case body 13.

Referring to FIG. 1 and FIG. 3, in some embodiments, a first lifting portion 128 is disposed on an outer peripheral surface of the case cover 12.

In some embodiments, the case cover 12 may have pressure relief modules 40 disposed inside, making the case cover 12 relatively heavy. The first lifting portion 128 is disposed on the outer peripheral surface of the case cover 12, facilitating lifting of the case cover 12 using a lifting tool.

In some embodiments, the first lifting portion 128 may have a lifting hole, allowing a lifting tool to extend into the lifting hole to lift the case cover 12.

In the technical solution of the embodiments of this application, due to the heavy weight of the case cover 12, a first lifting portion 128 is disposed on the outer peripheral surface of the case cover 12, facilitating the cooperation with a lifting tool to lift the case cover 12, and facilitating the connection and separation of the case cover 12 and the case body 13.

Figure 13:
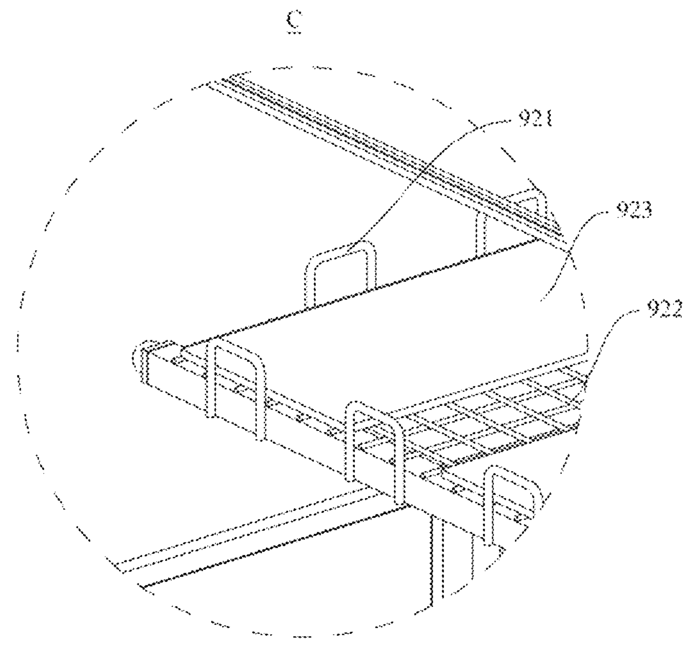
FIG. 13 is an enlarged view of position C in FIG. 1.

Referring to FIG. 1 and FIG. 13, FIG. 13 is an enlarged view of position C in FIG. 1. In some embodiments, the battery transportation protection device 1 further includes a tray 92, where the tray 92 is disposed on the bottom of the first accommodation cavity 11, the tray 92 is configured to support the battery, and a strap loop 921 is provided on a periphery of the tray 92.

In some embodiments, during battery transportation, the battery is first placed on the tray 92, the battery is secured with a strap, and the strap is connected to the strap loop 921. Then, the battery and the tray 92 are moved together into the first accommodation cavity 11.

In some embodiments, a material of the tray 92 may be metal.

In the technical solution of the embodiments of this application, the tray 92 supports the battery, and the battery is fixed with a strap loop 921, facilitating the fixation of the battery, and reducing the risk of interference caused by vibrations of the battery during transportation.

Referring to FIG. 1 and FIG. 13, in some embodiments, the tray 92 includes a tray body 922 and a pallet 923, where the tray body 922 has a multi-layer mesh structure, and the pallet 923 is disposed on an upper surface of the tray body 922 and configured to be in contact with the battery.

In some embodiments, the tray 92 may include a tray body 922, where the tray body 922 has a multi-layer mesh structure, to provide the tray body 922 with good cushioning capacity, reducing the risk of battery damage during transportation.

In some embodiments, the pallet 923 may be provided in plurality, and the plurality of pallets 923 are spaced apart along the first direction X or the second direction Y.

The case body 13 may include a case body frame 134. The case body frame 134 has a plurality of hollowed-out regions at its bottom, which may cause uneven battery placement during battery accommodation, leaving the battery at risk of shaking. In some embodiments, the battery is placed on the tray 92, providing good support for the battery.

In some embodiments, the tray 92 may be used to place the battery, and the battery may be a battery pack, a battery module, a battery cell, or the like.

In the technical solution of the embodiments of this application, the tray body 922 with a multi-layer mesh structure supports the battery, reducing the impact of vibrations on the battery during transportation, thereby improving reliability of the battery transportation protection device 1 in transporting batteries.

Referring to FIG. 11 and FIG. 12, in some embodiments, the battery transportation protection device further includes a locking mechanism 93, where the locking mechanism 93 is configured to limit the tray 92 in a direction opposite to the direction of gravity Z.

In some embodiments, the locking mechanism 93 may be a rotating shaft, where the rotating shaft extends along the direction of gravity Z and is mounted on the side wall 131 of the case body 13. The rotating shaft can rotate along its own axis. A limiting block is disposed at the lower part of the rotating shaft. When the battery is located in the first accommodation cavity 11, the tray 92 is disposed on the bottom of the first accommodation cavity 11, and the limiting block contacts the upper surface of the tray 92, thereby limiting the tray 92 in the direction of gravity Z.

When the battery needs to be removed, the rotating shaft is rotated so that the limiting block is no longer in contact with the tray 92. This allows the tray 92 to be taken out, thereby implementing the removal of the battery.

In the technical solution of the embodiments of this application, the locking mechanism 93 is disposed to limit the tray 92, so that the battery is also limited, thereby improving reliability of the battery transportation protection device 1 in transporting batteries.

Referring to FIG. 1, FIG. 3, and FIG. 12, in some embodiments, a first positioning portion 94 is disposed on the top of the case 10, and a second positioning portion 941 matching the first positioning portion 94 is disposed on the bottom of the case 10, and configured for stacking two battery transportation protection devices 1 along the direction of gravity Z.

In some embodiments, the first positioning portion 94 may be disposed on the top of the case cover 12, and the second positioning portion 941 may be disposed on the bottom of the case body 13. When two battery transportation protection devices 1 are stacked, the first positioning portion 94 of one battery transportation protection device 1 cooperates with the second positioning portion 941 of the other battery transportation protection device 1.

In some embodiments, the number of first positioning portions 94 may be the same as the number of second positioning portions 941. The case 10 may be a rectangular parallelepiped structure, the first positioning portions 94 may be disposed at the four corners of the top of the case 10, and the second positioning portions 941 may be disposed at the four corners of the bottom of the case 10.

In some embodiments, the first positioning portion 94 may be a plate bent to form an included angle, and the first positioning portion 94 is disposed at the top of the case 10 and protrudes from the upper surface of the case cover 12. The second positioning portion 941 also has an included angle matching the first positioning portion 94, and the second positioning portion 941 is disposed on the bottom of the case 10 and protrudes from the lower surface of the case body 13. When two battery transportation protection devices 1 are stacked, the plurality of first positioning portions 94 are located on the outer side of the second positioning portions 941, limiting the second positioning portions 941 in the horizontal direction, thereby reducing the risk of the upper battery transportation protection device 1 falling.

In the technical solution of the embodiments of this application, the first positioning portion 94 and the second positioning portion 941 are disposed, facilitating stacking of two battery transportation protection devices 1, thereby improving the convenience of battery transportation.

Referring to FIG. 12, in some embodiments, a forklift hole 95 is disposed on the bottom of the case 10.

In some embodiments, a forklift hole 95 is disposed on the bottom of the case 10, allowing a forklift to extend into the forklift hole 95 to transport the battery transportation protection device 1.

In some embodiments, a component provided with the forklift hole 95 may be disposed on the bottom of the case 10 and protrude from the lower surface of the case body 13, and the component provided with the forklift hole 95 may share space in the direction of gravity Z with the second positioning portion 941.

In the technical solution of the embodiments of this application, the forklift hole 95 is disposed on the bottom of the case 10, facilitating movement of the battery transportation protection device 1.

Figure 14:
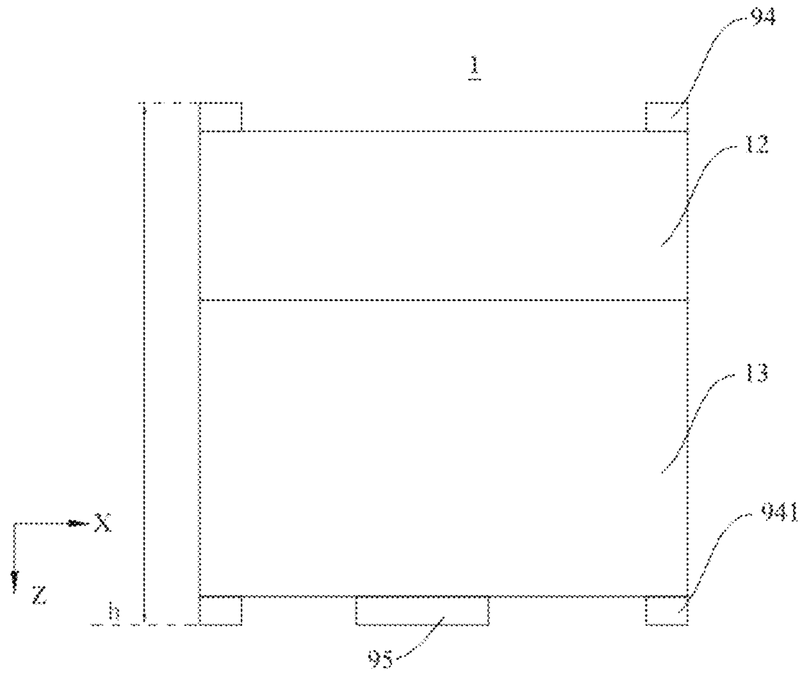
FIG. 14 is a schematic diagram of a battery transportation protection device according to some embodiments of this application.

Referring to FIG. 1 and FIG. 14, FIG. 14 is a schematic view of a battery transportation protection device according to some embodiments of this application. In some embodiments, a height of the battery transportation protection device 1 is h, satisfying 700 mm≤h≤1300 mm.

The battery transportation protection device 1 is typically transported using other vehicles, and typically a space for accommodating the battery transportation protection device 1 has a height of 2000 mm to 2700 mm. That is, during normal transportation, only two battery transportation protection devices 1 can be stacked in the vertical direction.

In some embodiments, the pressure relief modules 40 are disposed in the case cover 12, increasing the height of the battery transportation protection device 1, while the pressure relief modules 40 share the footprint with the first accommodation cavity 11 for transporting the battery, keeping the dimensions of the battery transportation protection device 1 unchanged in the horizontal direction. Compared to a design with the pressure relief channel 121 mounted on the side, the battery transportation protection device 1 of this solution has a higher height and a smaller horizontal dimension.

During transportation, the increased height still allows for stacking of two battery transportation protection devices 1 in the vertical direction without affecting transportation efficiency. In the horizontal direction, the battery transportation protection device 1 of this solution has a smaller dimension, allowing for transporting more battery transportation protection devices 1 of this application, thereby improving transportation efficiency.

In some embodiments, the height h of the battery transportation protection device 1 satisfies the above condition, and the height of the battery transportation protection device 1 may be any value of 700 mm, 750 mm, 800 mm, 850 mm, 900 mm, 950 mm, 1000 mm, 1050 mm, 1100 mm, 1150 mm, 1200 mm, 1250 mm, and 1300 mm, or any value between any two of these values.

In some embodiments, the height of the battery transportation protection device 1 may be 1150 mm.

It should be noted that since the battery transportation protection device 1 has a first positioning portion 94 protruding from the upper surface of the case cover 12 and a second positioning portion 941 protruding from the lower surface of the case body 13, when two battery transportation protection devices 1 are stacked, the first positioning portion 94 and the second positioning portion 941 share some space in the direction of gravity Z. Therefore, the height of one battery transportation protection device 1 may be 1150 mm, and the height of two battery transportation protection devices 1 may be 2260 mm.

In the technical solution of the embodiments of this application, the height of the battery transportation protection device 1 satisfying the above condition not only allows for accommodation of more batteries, but also facilitates placement of the battery transportation protection device 1 on transportation vehicles for transportation.

Referring to FIG. 1 and FIG. 3, in some embodiments, the battery transportation protection device 1 includes a case 10, and the case 10 may include a case cover 12 and a case body 13, where the case body 13 has a first opening 133, and the case cover 12 covers the first opening 133 to define the first accommodation cavity 11 together with the case body 13.

Referring to FIG. 3 and FIG. 8 to FIG. 10, a second accommodation cavity 122 is formed inside the case cover 12, and the battery transportation protection device 1 further includes a pressure relief module 40, where the pressure relief module 40 is disposed in the second accommodation cavity 122, the pressure relief module 40 is provided with a smoke inlet 41 and a smoke outlet 42 at two ends, respectively, the pressure relief channel 121 is formed inside the pressure relief module 40, and the pressure relief channel 121 connects the smoke inlet 41 and the smoke outlet 42.

The pressure relief module is disposed inside the case cover 12 to define the pressure relief channel, reducing the risk of excessive air pressure in the first accommodation cavity 11, thereby improving reliability of the battery transportation protection device 1 in transporting batteries.

In some embodiments, the pressure relief module 40 includes a housing 43 and a filter 44, where an internal space of the housing 43 forms the pressure relief channel 121, and the filter 44 is disposed within the pressure relief channel 121.

When a battery undergoes thermal runaway and generates gas, the gas typically contains toxic gases and solid impurities from the battery. The filter 44 is disposed in the pressure relief channel 121 to filter the gas in the pressure relief channel 121, reducing the risk of environmental pollution and losses caused by the discharged gas.

In some embodiments, the filter 44 includes a stainless steel fiber filter 441, a glass fiber filter 442, and a ceramic fiber filter 443, where along a gas flow direction in the pressure relief channel 121, the stainless steel fiber filter 441, the glass fiber filter 442, and the ceramic fiber filter 443 are arranged in sequence.

The stainless steel fiber filter 441, the glass fiber filter 442, and the ceramic fiber filter 443 are arranged in sequence along the gas flow direction in the pressure relief channel 121 to filter toxic gases and solid impurities from the battery, thereby improving the reliability of the filter 44, and reducing the impact of the discharged gas on the external environment.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A battery transportation protection device, comprising:

a case, comprising a case cover and a case body, wherein the case body has a first opening, and the case cover covers the first opening to define, together with the case body, a first accommodation cavity for accommodating a battery, a second accommodation cavity is formed inside the case cover, a pressure relief channel is formed inside the case cover, and the pressure relief channel is in communication with the first accommodation cavity and configured to discharge gas from the first accommodation cavity; and a plurality of pressure relief modules disposed in the second accommodation cavity and arranged in two rows, wherein each of the plurality of pressure relief modules is provided with a smoke inlet and a smoke outlet at two ends, respectively, an axis of the smoke inlet is parallel to an axis of the smoke outlet, the pressure relief channel is formed inside each of the plurality of pressure relief modules, and connects the smoke inlet and the smoke outlet of the each of the plurality of pressure relief modules;

wherein:

the plurality of pressure relief modules in each of the two rows are arranged along a first direction;

the two rows are spaced apart along a second direction, and the first direction is perpendicular to the second direction; and a projection of the smoke inlet on a plane perpendicular to the second direction and a projection of the smoke outlet on the plane perpendicular to the second direction overlap with each other.

2. The battery transportation protection device according to claim 1, further comprising:

a gas collection cover, wherein the gas collection cover is disposed between the two rows of pressure relief modules and connected to the plurality of pressure relief modules;

wherein an internal space of the gas collection cover connects the first accommodation cavity and the plurality of smoke inlets.

3. The battery transportation protection device according to claim 2, wherein the gas collection cover is one of two gas collection covers connected to the two rows of pressure relief modules, respectively.

4. The battery transportation protection device according to claim 1, wherein each of the plurality of pressure relief modules comprises a housing and a filter, wherein an internal space of the housing forms the pressure relief channel, and the filter is disposed within the pressure relief channel.

5. The battery transportation protection device according to claim 4, wherein the filter comprises a stainless steel fiber filter, a glass fiber filter, and a ceramic fiber filter, wherein along a gas flow direction in the pressure relief channel, the stainless steel fiber filter, the glass fiber filter, and the ceramic fiber filter are arranged in sequence.

6. The battery transportation protection device according to claim 4, wherein each of the plurality of pressure relief modules further comprises a guide plate, wherein the guide plate is disposed within the housing.

7. The battery transportation protection device according to claim 1, wherein the case cover comprises a case cover frame, a first thermal insulation lining, and a second thermal insulation lining, wherein the case cover frame supports the plurality of pressure relief modules, the first thermal insulation lining and the second thermal insulation lining are both connected to the case cover frame, the first thermal insulation lining is disposed around the plurality of pressure relief modules, the second thermal insulation lining is disposed above the plurality of pressure relief modules, and the first thermal insulation lining and the second thermal insulation lining together enclose the second accommodation cavity.

8. The battery transportation protection device according to claim 7, wherein a material of the first thermal insulation lining comprises aerogel; and a material of the second thermal insulation lining comprises aerogel.

9. The battery transportation protection device according to claim 7, wherein the case cover further comprises a case cover outer plate, wherein the case cover outer plate is connected to the case cover frame, the case cover outer plate is disposed around the plurality of pressure relief modules, and the case cover outer plate is located on an outer side of the first thermal insulation lining.

10. The battery transportation protection device according to claim 9, wherein the first thermal insulation lining is provided with a first pressure relief port, the case cover outer plate is provided with a second pressure relief port corresponding to the first pressure relief port, and the first pressure relief port connects the second pressure relief port and the pressure relief channel.

11. The battery transportation protection device according to claim 7, wherein the case cover further comprises a case cover top plate, wherein the case cover top plate is connected to the case cover frame, and the case cover top plate is located on a side of the second thermal insulation lining facing away from the plurality of pressure relief modules.

12. The battery transportation protection device according to claim 1, further comprising:

a detection component disposed on the case, wherein the detection component is configured to detect an environmental parameter within the first accommodation cavity; and a firefighting mechanism connected to the case cover, wherein the firefighting mechanism is configured to release a firefighting medium into the first accommodation cavity when the environmental parameter exceeds a threshold.

13. The battery transportation protection device according to claim 12, wherein the firefighting mechanism is located above the first accommodation cavity, and the firefighting mechanism is configured as capable of switching between a first state and a second state, wherein in the first state, the firefighting mechanism holds the firefighting medium; and in the second state, the firefighting mechanism releases the firefighting medium.

14. The battery transportation protection device according to claim 13, wherein:

the firefighting mechanism comprises a first support plate, wherein the first support plate is configured as capable of rotating about a first axis, an extension direction of the first axis being perpendicular to the direction of gravity; and in the first state, the first support plate is in a horizontal posture to hold the firefighting medium; and in the second state, the first support plate is in a vertical posture or an inclined posture to release the firefighting medium.

15. The battery transportation protection device according to claim 14, further comprising:

a second support plate, wherein the second support plate is fixedly disposed relative to the case and in a horizontal posture to hold the firefighting medium, and the first support plate is rotatably connected to the second support plate;

wherein the detection component is disposed on the second support plate.

16. The battery transportation protection device according to claim 12, wherein the environmental parameter comprises at least one of temperature, combustible gas concentration, and air pressure.

17. The battery transportation protection device according to claim 12, wherein the firefighting medium comprises flame-retardant microbeads.

18. The battery transportation protection device according to claim 17, wherein the flame-retardant microbead comprises at least one of glass microbead, ceramic microbead, or mineral microbead.

* * * * *